(12) United States Patent
Kamran et al.

(10) Patent No.: US 11,995,329 B1
(45) Date of Patent: May 28, 2024

(54) TECHNIQUES FOR IMPROVING WRITE PERFORMANCE USING ZONE SHARING IN LOG STRUCTURED SYSTEMS

(71) Applicant: Dell Products L.P., Hopkinton, MA (US)

(72) Inventors: Lior Kamran, Rishon LeZion (IL); Amitai Alkalay, Kadima (IL); Vladimir Shveidel, Pardes-Hana (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/994,794

(22) Filed: Nov. 28, 2022

(51) Int. Cl.
*G06F 12/00* (2006.01)
*G06F 3/06* (2006.01)

(52) U.S. Cl.
CPC ............ *G06F 3/064* (2013.01); *G06F 3/0644* (2013.01); *G06F 3/0679* (2013.01); *G06F 3/0604* (2013.01)

(58) Field of Classification Search
CPC ...... G06F 3/064; G06F 3/0644; G06F 3/0679; G06F 3/0604
See application file for complete search history.

(56) References Cited

U.S. PATENT DOCUMENTS

| | | | | |
|---|---|---|---|---|
| 10,545,667 | B1 * | 1/2020 | Magerramov | G06F 3/0607 |
| 11,061,930 | B1 * | 7/2021 | Golding | G06F 3/0611 |
| 11,307,931 | B1 * | 4/2022 | Bert | G06F 11/073 |
| 2021/0182166 | A1 * | 6/2021 | Hahn | G06F 11/3034 |
| 2022/0156087 | A1 * | 5/2022 | Karr | G06F 9/4401 |

OTHER PUBLICATIONS

U.S. Appl. No. 16/527,880, filed Jul. 31, 2019, entitled System and Method for Improving Write Performance for Log Structured Storage Systems, to Amitai Alkalay, et al.

* cited by examiner

*Primary Examiner* — John A Lane
(74) *Attorney, Agent, or Firm* — Muirhead and Saturnelli, LLC

(57) ABSTRACT

A data storage system can use non-volatile solid state drives (SSDs) to provide backend storage. The data storage system and SSDs can implement log structured systems (LSSs) experiencing write amplification (WA). The SSDs can be partitioned into zones. To reduce WA of the SSD-internal LSS, multiple nodes can write to a single active zone. The active zone can be partitioned into portions each assigned for exclusive use by one of the nodes. Each node can allocate storage from its corresponding portion of the active zone. When a node consumes a threshold amount of its portion, the active zone can be repartitioned in accordance with storage consumption, write or allocation rates of the nodes. When the active zone does not have a minimum amount of free space, the active zone can be finally repartitioned. A node can switch its active zone to a next zone once it consumes its final partition.

20 Claims, 12 Drawing Sheets

TECHNIQUES FOR IMPROVING WRITE PERFORMANCE USING ZONE SHARING IN LOG STRUCTURED SYSTEMS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system a non-transitory computer readable medium. The system can include one or more processors and a memory including code that, when executed performs the method. The non-transitory computer readable medium can include code that, when executed, performs the method. The method can comprise: partitioning a plurality of non-volatile solid state drives (SSDs) into a plurality of zones; for a first zone of the plurality of zones, partitioning the first zone into a first portion and a second portion, wherein the first portion is assigned to a first node for allocating physical blocks of storage used exclusively by the first node, and wherein the second portion is assigned to a second node for allocating physical blocks of storage used exclusively by the second node, wherein a first boundary denotes a boundary partitioning the first zone into the first portion and the second portion; maintaining, by each of the first node and the second node, a plurality of parameters used exclusively by said each node, wherein the plurality of parameters includes a first parameter denoting the first zone as an active zone to be used for allocating physical blocks of storage for said each node, wherein the plurality of parameters includes a second parameter identifying the first boundary as an active zone boundary in the active zone denoted by the first parameter, wherein said each node only allocates physical storage blocks from a corresponding portion of the active zone denoted by the first parameter, wherein the corresponding portion of the active zone of said each node is in accordance with the active zone boundary identified by the second parameter; allocating, for the first node, a first plurality of physical blocks from the first portion used exclusively by the first node; determining that the first node has consumed a threshold amount of the first portion of the first zone; and responsive to determining the first node has consumed the threshold amount of the first portion of the first zone, dynamically determining a second boundary denoting a repartitioning of the first zone into a revised first portion and a revised second portion, wherein the revised first portion is assigned to the first node for allocating physical blocks of storage used exclusively by the first node, wherein the revised second portion is assigned to the second node for allocating physical blocks of storage used exclusively by the second node.

In at least one embodiment, a first plurality of parameters can denote the plurality of parameters used exclusively by the first node, and wherein a second plurality of parameters can denote the plurality of parameters used exclusively by the second node. Processing can include: updating the second parameter of the first plurality of parameters, used exclusively by the first node, to identify the second boundary; and updating the second parameter of the second plurality of parameters, used exclusively by the second node, to identify the second boundary. Subsequent to said dynamically determining the second boundary, processing can include allocating a physical block of storage for the first node from the first revised portion.

In at least one embodiment, the second boundary can be determined in accordance with a first rate at which the first node allocates, consumes or writes to physical blocks from the first portion of the first zone, and in accordance with a second rate at which the second node allocates, consumes or writes to physical blocks from the second portion of the first zone. The first boundary can denote a middle of the first zone wherein the first portion and the second portion each include the same number of physical blocks. The first rate can be greater than the second rate, and wherein the second boundary can provide for repartitioning the first zone resulting in the first revised portion having more physical blocks of storage than the second revised portion.

In at least one embodiment, processing can include: determining whether the first zone includes at least a minimum amount of free storage; and responsive to determining that the first zone does not includes at least the minimum amount of free storage, performing first processing including: performing a final partitioning of the first zone in accordance with a final boundary for the first zone, wherein the final boundary partitions the first zone into a first final portion and a second final portion, wherein the first final portion is assigned to the first node for allocating physical blocks of storage used exclusively by the first node, and wherein the second final portion is assigned to the second node for allocating physical blocks of storage used exclusively by the second node. The final boundary can be determined in accordance with a third rate at which the first node allocates, consumes or writes to physical blocks of storage from the first final portion of the first zone, and in accordance with a fourth rate at which the second node allocates, consumes or writes to physical blocks of storage from the second final portion of the first zone.

In at least one embodiment, the first processing can include: selecting a second zone of the plurality of zones as a next zone; assigning the second zone to a third parameter of each of the first plurality of parameters and the second plurality of parameters; selecting a second zone boundary partitioning the second zone into a third portion and a fourth portion; and selecting assigning the second zone boundary to a fourth parameter of each of the first plurality of parameters and the second plurality of parameters. Processing can include: subsequent to performing said first processing, determining that the first node has allocated all physical blocks of storage from the first final portion; and responsive to determining that the first node has allocated all physical blocks of storage from the first final portion, performing second processing by the first node, said second processing including: assigning the current value of the third parameter of the first plurality of parameters used by the first node to the first parameter of the first plurality of parameters used by the first node, wherein the current value of the third parameter identifies the second zone, and wherein said assigning the current value of the third parameter of the first plurality thereby updates the active zone of the first node to be the second zone; and assigning the current value of the fourth parameter of the first plurality of parameters used by the first node to the second parameter of the first plurality of parameters used by the first node, wherein the current value of the fourth parameter identifies the second zone boundary, and wherein said assigning the current value of the fourth parameter of the first plurality thereby updates the active zone boundary of the first node to be the second zone boundary and indicates that the active zone is partitioned into the third portion and the fourth portion, wherein the third portion is assigned to the first node for allocating physical blocks of storage used exclusively by the first node, and wherein the fourth portion is assigned to the second node for allocating physical blocks of storage used exclusively by the second node.

In at least one embodiment, the method can be performed in a data storage system which implements a log structured system (LSS), wherein a log of the LSS includes a plurality of records each denoting a recorded write operation. Processing can include: flushing the plurality of records from the log, wherein the plurality of records corresponds to a plurality of write operations recorded in the log; and responsive to said flushing, storing content written by the plurality of write operations to the plurality of SSDs. The plurality of write operations can be received by the first node, and wherein said allocating, for the first node, the first plurality of physical blocks from the first portion used exclusively by the first node, can be performed responsive to receiving the plurality of write operations. Processing can include storing, by the first node, content written by the plurality of write operations to the first plurality of physical blocks. Each of the plurality of non-volatile SSDs can implement a second LSS internally in said each SSD.

BRIEF DESCRIPTION OF THE DRAWINGS

Features and advantages of the present disclosure will become more apparent from the following detailed description of exemplary embodiments thereof taken in conjunction with the accompanying drawings in which.

Figure 1:
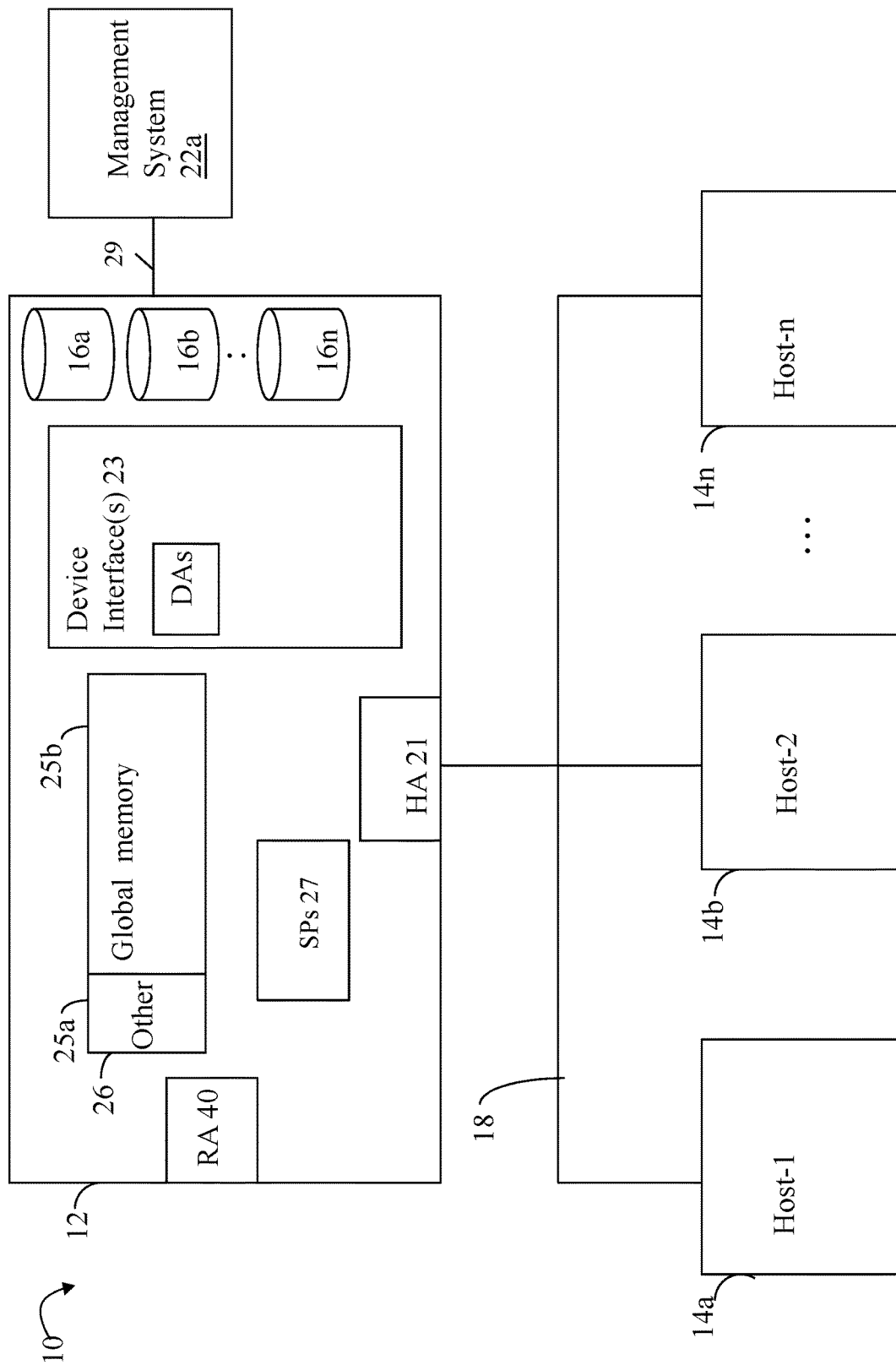
FIG. 1 is an example of components included in a system in accordance with the techniques of the present disclosure.

DETAILED DESCRIPTION OF
EMBODIMENT(S)

Generally, log structured stores or systems (LSSs) can be characterized by allowing new writes to be directed to free or unused space on a data storage device, and by performing garbage collection that allows holes of storage including unused or invalid data to be compacted and reused. In an LSS, newly written data can be appended to one end of a circular logical log structure in a sequential manner. The log can be persistently stored on a form of non-volatile storage. Subsequently, writes which are recorded in the log can be flushed from the log, whereby data or content written by the flushed log records can be persistently stored to longer term persistent storage, such as non-volatile storage on solid state storage devices or SSDs providing backend (BE) non-volatile storage. As newly written data provides updated values for existing data stored at a logical address, the BE non-volatile storage, such as SSDs containing the existing data, can be invalidated and freed for reuse.

As noted above, modern data storage systems can implement an LSS and additionally, such modern data storage system utilize BE non-volatile storage which includes SSDs such as flash-based storage devices. The SSDs, such as flash memory storage devices, can employ another LSS since the SSDs do not support in-place data updates. The LSS employed by an SSD can perform a device-level layer of mapping from logical to physical addresses.

Thus, a system can utilize two layers or levels of logs and LSSs including an upper level LSS employed by the data storage system and a lower level LSS employed at the SSD device level. Each layer of logs or each LSS can have its components, for example, to maintain its own log, perform its own logical to physical address translation using its own metadata, to perform garbage collection, to perform storage management controlling data placement, to perform metadata management, and the like.

Both the LSS of the data storage system and the LSS at the SSD level each encounter write amplification (sometimes denoted WA) which can generally be characterized as additional writes performed in order to write or store a single unit of valid data. The write amplification can occur generally due to the nature of operation of the LSS.

In a data storage system (DS) which implements an LSS, such as described above for storing writes or updates to user data, the DS itself can perform GC as needed to obtain free contiguous chunks of storage such as non-volatile storage on the BE PDs. The GC performed by the DS can be done as a maintenance or background task as user logical addresses are overwritten or updated with multiple writes to the same logical address. In this case, the DS can perform GC to reuse the storage which contains old or invalid content that is replaced or updated with new content in the LSS. Consistent with other discussion herein, both valid content and invalid content can be stored within a first large contiguous chunk of storage whereby the DS can perform GC to move the valid content to a second chunk in order to free all storage within the first chunk. Such GC as performed by the DS results in write amplification denoting the extra or additional writes performed in connection with copying or moving valid content in order to obtain the contiguous free chunk of storage.

Additionally, when the BE PDs are SSDs, each such SSD or drive can internally implement an LSS managed internally by drive. As such, the SSD can also perform internal GC to obtain free erase blocks of storage available for reuse. Such internal GC within an SSD also results in write amplification. Thus, in such a system having two levels of LSSs—one managed by the DS and a second managed internally within each SSD—write amplification penalties are incurred by both LSSs.

One approach to reduce the SSD internal GC and associated write amplification includes partitioning each SSD into virtual or logical zones each including multiple erase blocks. Each zone can denote a contiguous SSD-logical address range of storage. The DS can manage storage of its LSS such that storage within a single contiguous zone does not include any valid content or data. Put another way, the LSS of the DS can perform GC to move all valid content out of a first zone Z1 to a different second zone Z2 thereby making the first zone Z1 inactive or unused (e.g., does not store any valid content), and the second zone Z2 active or used (e.g., storing valid content). Subsequently, the DS can issue to the SSD an unmap command for the SSD logical address space associated with Z1 where the unmap command informs the SSD that Z1 does not contain any valid content and can be reused. In at least one system, the unmap command can be issued by the LSS of the DS to inform the SSD that the LSS of the DS is no longer using or storing content in the SSD logical address space associated with Z1. In this manner, unmapping Z1 indicates to the SSD that the SSD physical storage mapped to the logical address space of Z1 can be erased or freed by internal SSD storage management. If the erase blocks used by or mapped to Z1 are used only by Z1 and not shared with or mapped to any other SSD logical address space (e.g., not mapped to another zone), the physical storage associated with the unmapped Z1 can be erased and reused by the SSD without performing SSD-internal GC (e.g., without requiring copying valid content of another zone from a shared erase block). In this manner, the SSD-internal GC is reduced and results in improvements in SSD write performance and endurance.

However, a problem arises when writing to multiple zones of the same SSD in parallel or concurrently. Assume in a dual node system each node has multiple processing cores where the processing cores of each node write to a different zone. For example, assume node A and its processing cores write to zone Z1 of an SSD concurrently while node B and its processing cores write to zone Z2 of the same SSD. The underlying SSD is an LSS such that writes occurring in parallel or about the same time can be written sequentially or physically near each other on the SSD such that a first write W1 to address LA1 in Z1 and a second write W2 to address LA2 in Z2 can be stored in the same erase block B1 on the SSD physical storage media by the LSS of the SSD. Put another way, when the two nodes A and B write concurrently to different zones, a same single erase block B1 can be shared by multiple zones and can include valid content or data from the multiple different zones, such as Z1 and Z2, which are written to concurrently. As a result, when the DS issues an unmap command to unmap Z1, the SSD may still be required to perform GC to free or clear erase blocks of Z1 for reuse. For example, after issuing the above-noted unmap command to the SSD to unmap Z1, the GC performed internally by the SSD can include moving valid content of Z2 out of any erase blocks shared between Z1 and Z2 such as the erase block B1.

Generally, the number of zones within a single SSD, that are written concurrently, has a significant adverse performance impact and results in increases in write amplification as performed internally with the SSD. The more zones which are written concurrently, the more data blocks from different zones are mixed within the same erase blocks, which increases the required SSD internal GC data movements, increases the internal SSD write amplification, and degrades the system performance and drive endurance. For example, tests performed by the inventors have indicated that writing to two zones in parallel or concurrently on the same SSD may increase the internal SSD write amplification by as much as 65%, depending on various characteristics such as the SSD drive model, zone size, and the like, in comparison to writing to a single zone on the SSD. The foregoing provides a strong motivation to avoid writing to multiple zones in parallel or concurrently on the same SSD. Thus, straightforward approaches or alternatives include allowing concurrent and parallel writes to multiple zones which result in mixing data from different nodes within the same erase block thereby incurring additional write amplification and degraded performance. An alternative approach is to completely disallow or avoid writing to more than one zone concurrently or in parallel thereby typically incurring significant CPU and network overhead costs needed for synchronizing writes from multiple nodes or CPUs to the single zone, which may degrade the system performance.

Accordingly, described in the present disclosure are techniques which allow multiple nodes, such as multiple processors or cores of such nodes, to write to the same SSD, and in particular, the same zone, concurrently in a synchronized manner. The techniques of the present disclosure provide for minimizing overhead costs incurred with respect to CPU and network resources. The techniques of the present disclosure further provide for minimal mixing of data from two different zones in the same erase block, which reduces the write amplification incurred by the SSD internal GC thereby resulting in improved performance and endurance. Thus in at least one embodiment, the techniques of the present disclosure do not completely disallow or completely avoid mixing of data from multiple zones on the same erase block but rather provide for reducing and minimizing instances where content from multiple zones is stored in the same erase block in efforts to reduce write amplification incurred by the SSD internal GC.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
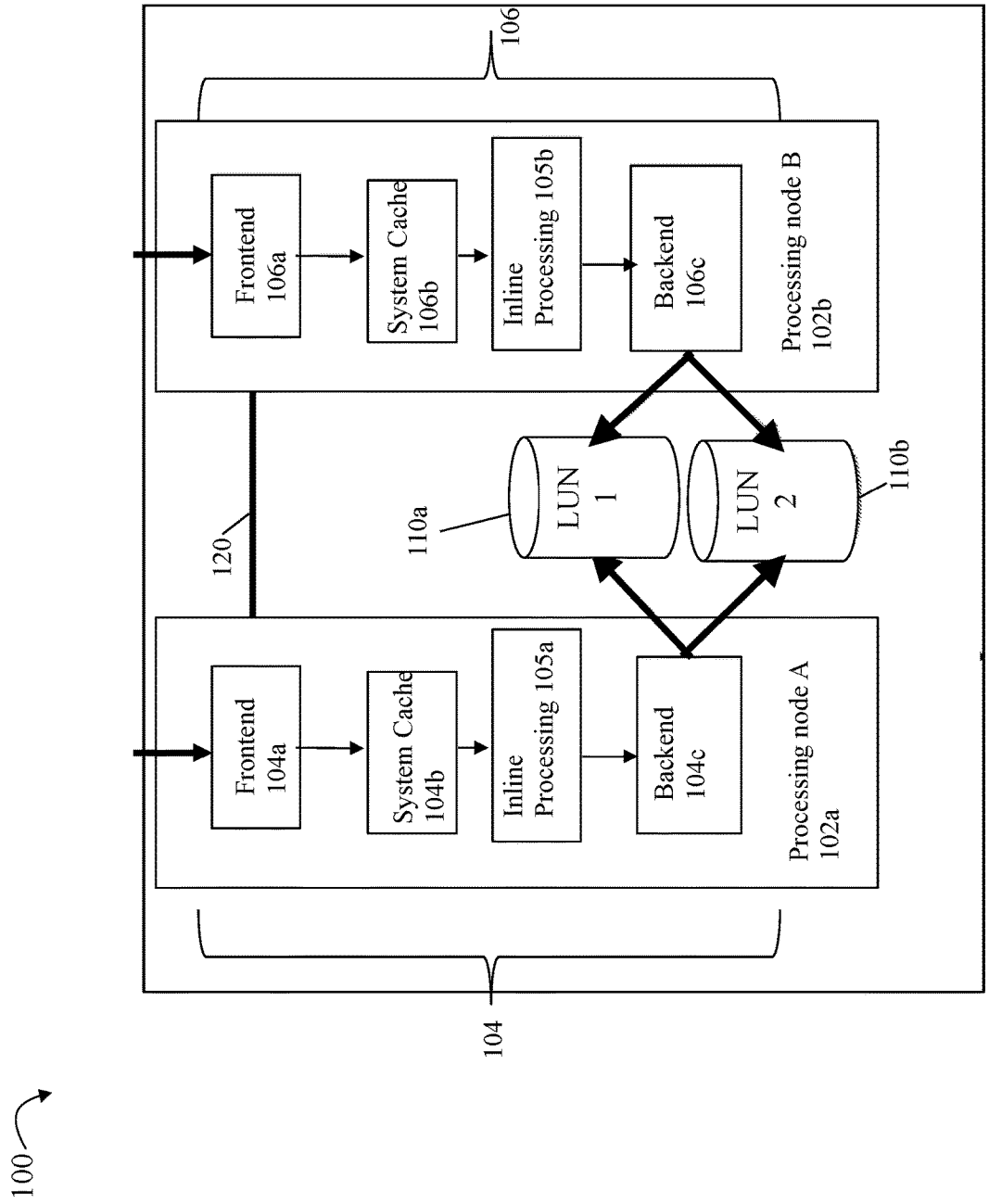
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure (sometimes referred to as a DAE or disk array enclosure) can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
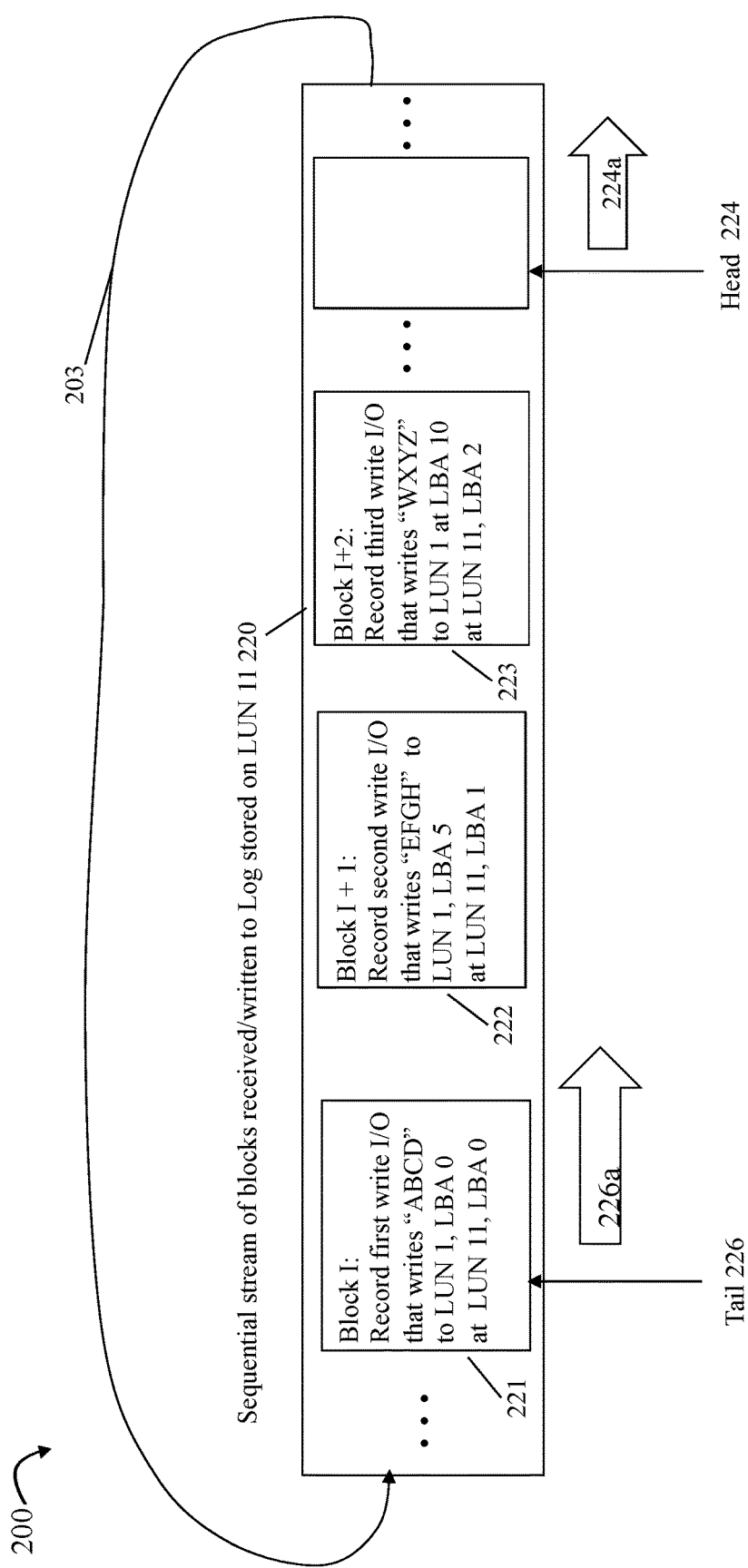
FIGS. 3, 4, 5 and 6 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
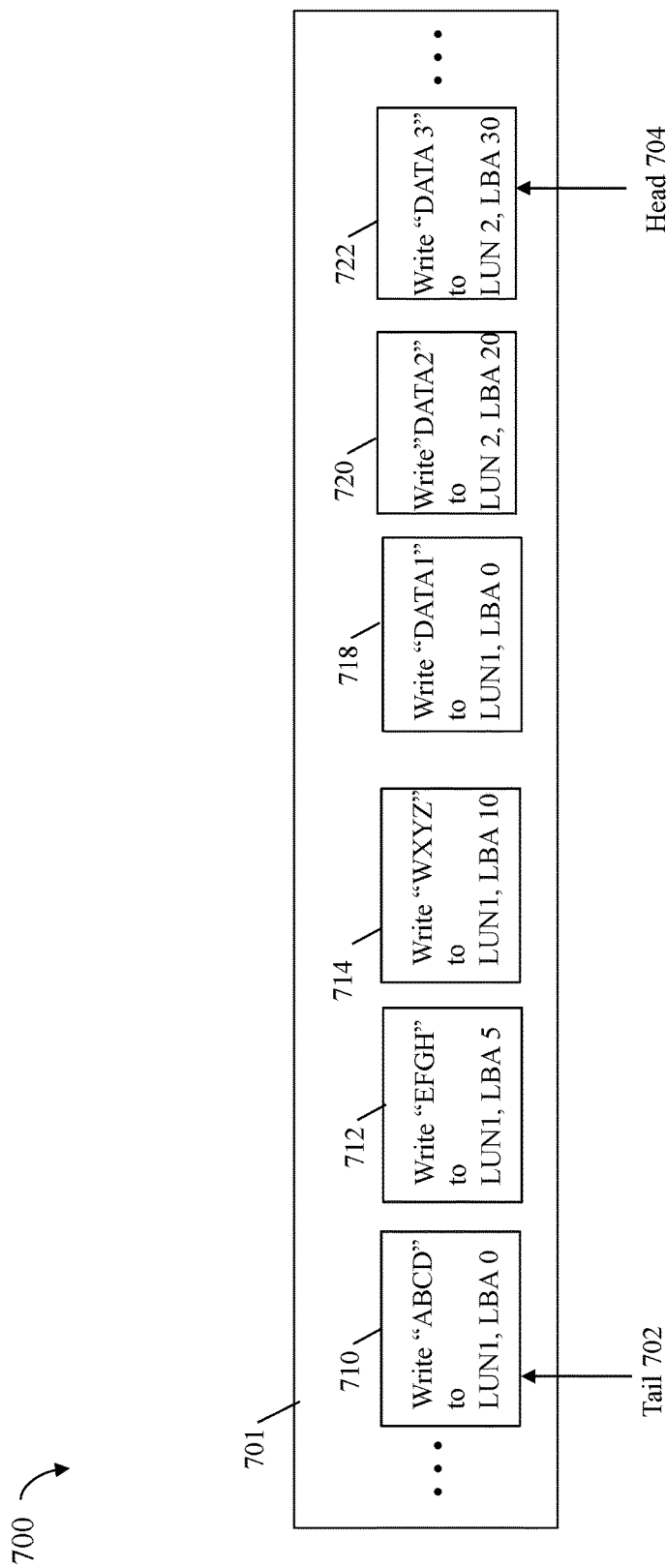

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
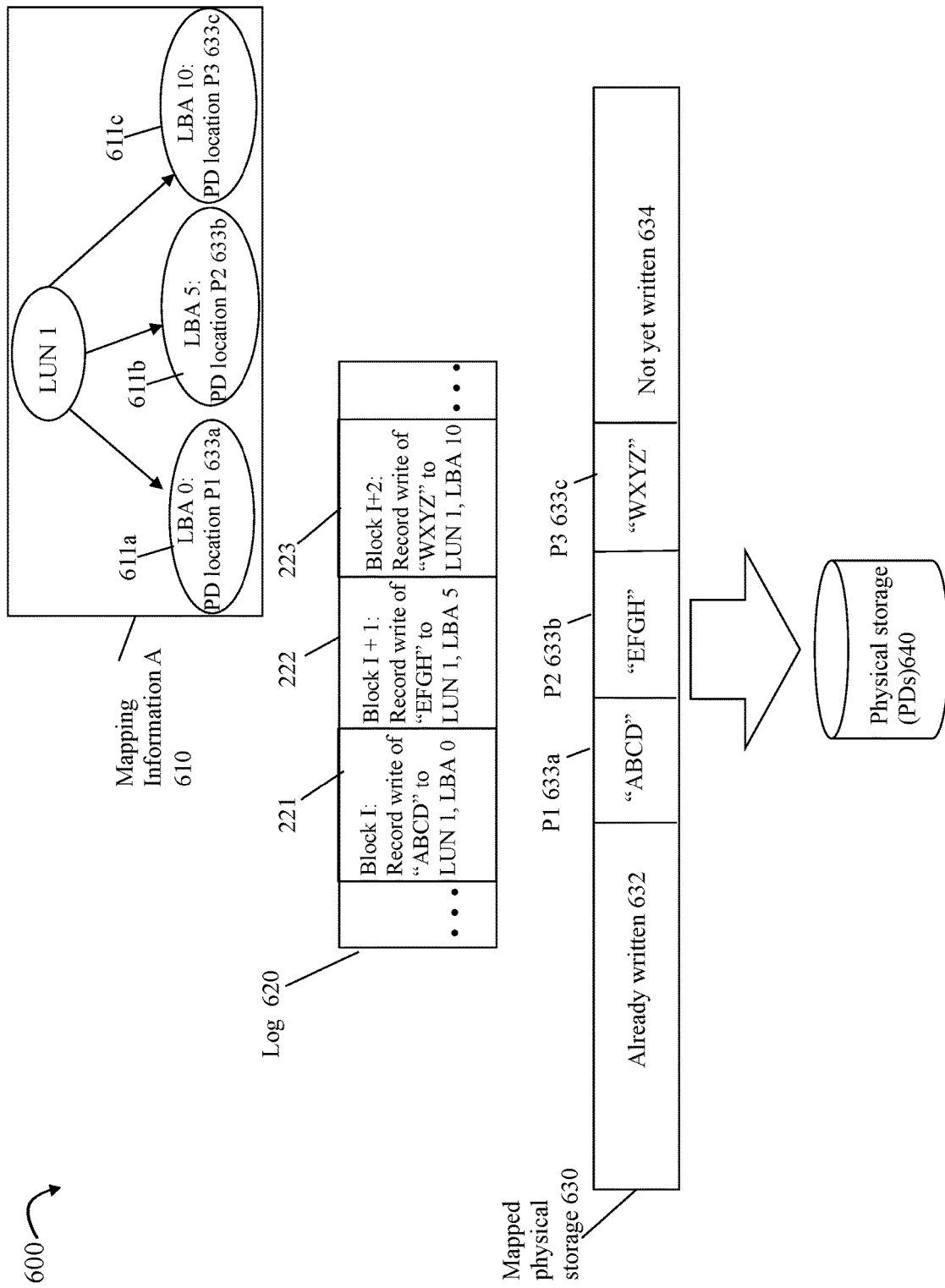

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs.

Figure 6:
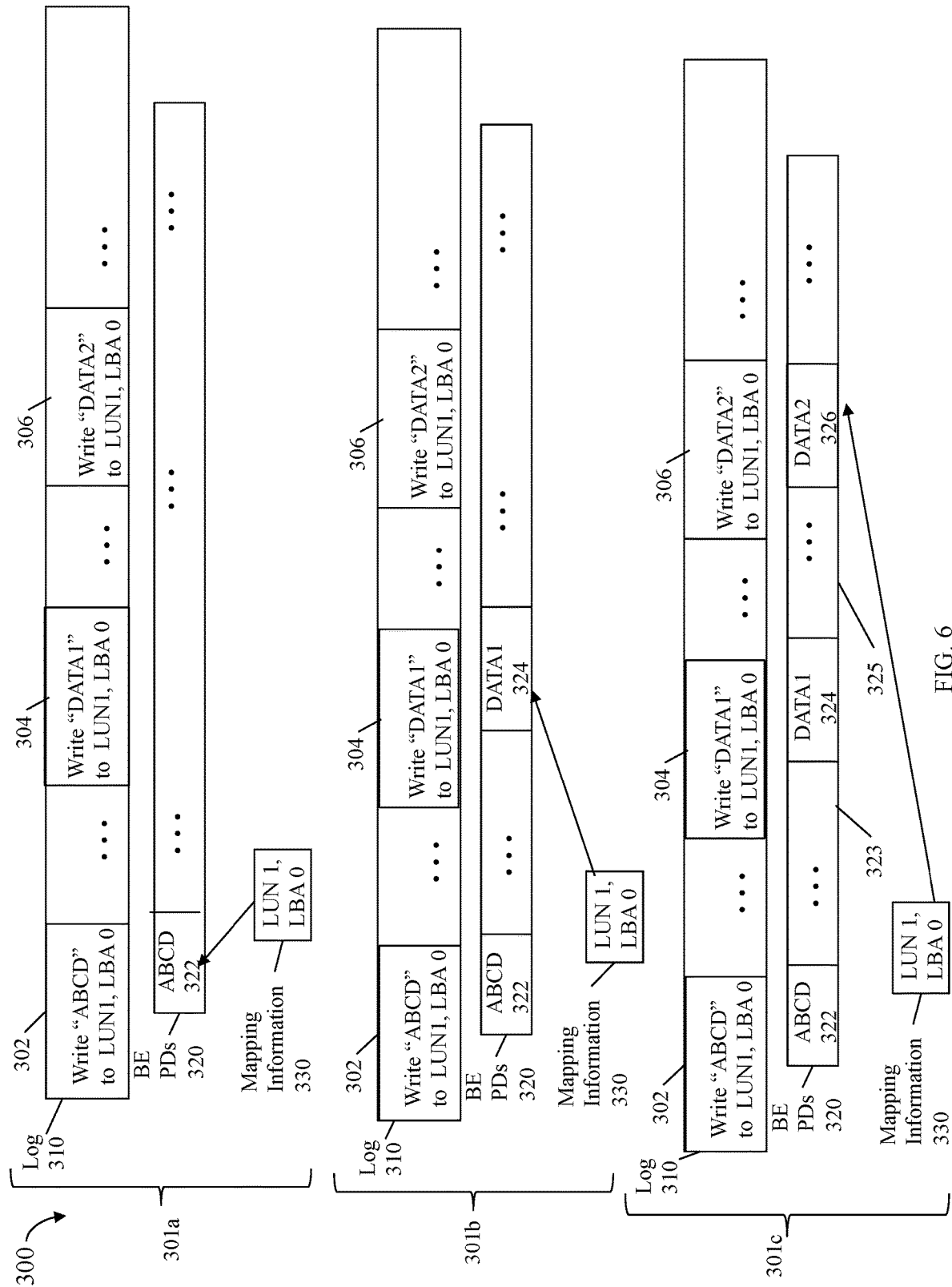

For example with reference to FIG. 6, the element 301*a* can denote the state of the log file 310, BE PDs 320 and mapping information 330 at a first point in time T1 after processing the record 302 for a first write of "ABCD" to the logical address LUN A, LBA 0. The data written "ABCD" by the recorded write of 302 can be stored at the BE PD location 322. Thus, flushing the log record 302 results in storing the write data "ABCD" to the BE PD location 322 and additionally updating the mapping information 330 to reference the BE PD location 322. The mapping information 330 denotes the metadata used to map the logical address LUN 1, LBA 0 to the current physical location on the BE PDs containing the user data or content stored at the logical address LUN 1, LBA 0. After the log record 302 is flushed from the log 310, the record 302 is available and can be subsequently reclaimed for reuse for logging other operations in the log 310.

At a second point in time T2 subsequent to T1, the log record 304 can be processed and flushed to the BE PDs 320. The element 301*b* denotes the state of the log file 310, BE PDs 320 and mapping information 330 at the second point in time T2 after processing the record 304 for a second write of "DATA1" to the logical address LUN A, LBA 0. The data written "DATA1" by the recorded write of 304 can be stored at the BE PD location 324. Thus, flushing the log record 304 results in storing the write data "DATA1" to the BE PD location 324 and additionally updating the mapping information 330 to reference the BE PD location 324 denoting the physical location containing the data stored at the LUN 1, LBA 0 at the time T2. Additionally, the PD location 322 can be invalidated since it no longer contains valid current data for the logical address LUN 1, LBA 0, whereby the PD location 322 can be available for reuse. After the log record 304 is flushed from the log 310, the record 304 is available and can be subsequently reclaimed for reuse for logging other operations in the log 310.

At a third point in time T3 subsequent to T2, the log record 306 can be processed and flushed to the BE PDs 320. The element 301*c* denotes the state of the log file 310, BE PDs 320 and mapping information 330 at the third point in time T3 after processing the record 306 for a third write of "DATA2" to the logical address LUN A, LBA 0. The data written "DATA2" by the recorded write of 306 can be stored at the BE PD location 326. Thus, flushing the log record 306 results in storing the write data "DATA2" to the BE PD location 326 and additionally updating the mapping information 330 to reference the BE PD location 326 denoting the physical location containing the data stored at the LUN 1, LBA 0 at the time T3. Additionally, the PD location 324 can be invalidated since it no longer contains valid current data for the logical address LUN 1, LBA 0, whereby the PD location 324 can be available for reuse. After the log record 306 is flushed from the log 310, the record 306 is available and can be subsequently reclaimed for reuse for logging other operations in the log 310.

As illustrated by the elements 301*a-c*, over time, the physical storage locations 322, 324 of the BE PDs 320 become free and available for reuse. The other physical storage locations 323, 325 and 326 can still contain valid data. Thus, the free, available reusable physical storage locations 322, 324 can form holes or segments interspersed among the other portions 323, 325, 326 containing valid data. More generally, the size of the holes 322, 324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

In data storage systems implementing a LSS such as described above, garbage collection can be performed by the data storage system at various times in an embodiment. Garbage collection processing can be performed by the data storage system on the BE PDs to aggregate allocated stored data blocks with valid data to eliminate free unused physical storage locations that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks, such as 323, 325 and 326 at the time T3, are relocated from their source locations, the storage locations 322, 323, 324, 325 and 326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs in size. Within a single PLB, the valid data and the holes (e.g., containing invalid data or designated as an unused portion) can be interspersed since, for example, write granularity size units can be 4K chunks or blocks.

Utilization, such as of a single PLB, can be expressed as a percentage or ratio of allocated consumed storage that contains valid data with respect to the total storage capacity of the PLB. For example, if 25% of the PLB is allocated and includes valid data and the remaining 75% of the PLB is unused and free (e.g., contains invalid data or holes of unused storage), the utilization for the single PLB is 25%. Generally, the lower the per PLB utilization, the more efficient the garbage collection since larger amounts of free capacity are reclaimed and aggregated from PLBs with lower utilization. For example, consider 2 source PLBs that contain a mixture of 50% valid data and 50% invalid data or holes (e.g., each PLB has a 50% utilization with the remaining 50% of the PLB containing invalid or free holes of storage). Garbage collection can be performed to consolidate the valid data in the 2 source PLBs into a single target PLB by copying the valid data from the 2 source PLBs to the target PLB. The foregoing consolidation results in a net gain of 1 free PLB by freeing the 2 source PLBs, and consuming or using the single target PLB that contains the consolidated valid data from the 2 original source PLBs. As another example, consider 4 source PLBs each having a 25% utilization (e.g., each PLB contains 25% valid data with the remaining 75% of the PLB containing invalid or free holes of storage). In this case, garbage collection can be performed to consolidate the valid data of the 4 source PLBs into a single target PLB by copying the valid data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs.

In a data storage system implementing an LSS, garbage collection can be performed by the data storage system in a continuous manner to manage its BE PDs and reclaim physical storage of holes including unused storage or storage with invalid data. The garbage collection results in performing additional overhead operations such as additional read and write operations in connection with reading valid data from the source PLBs and writing the valid data of the source PLBs to a target PLB. The total writes performed by the data storage system in connection with writing new valid data (e.g., such as data written by a host) to a single unit of storage includes the overhead or additional writes performed by the data storage system in connection with garbage collection and management of the system's BE PDs in order to free the single unit of storage, such as the single PLB, given that the source PLBs from which the valid data is read have a certain PLB utilization. The foregoing total number of writes can denote the write amplification, WA.

In at least one embodiment, the data storage system or appliance can implement an LSS as discussed herein. Additionally, the internal storage management of the non-volatile SSDs (e.g., BE PDs) providing the backend storage can also implement an LSS, where the LSS of the SSD internally also performs garbage collection of its physical storage in a manner similar to that as described above for the LSS of the data storage system. Thus in such an embodiment, garbage collection of the internal LSSs of the SSDs can also incur write amplification WAs in a manner similar to the write amplification $WA_m$ incurred in connection with garbage collection of the LSS implemented by the data storage system or appliance.

In at least one embodiment, $WA_m$ denoting the WA of the data storage system or storage appliance, represents the WA with respect to the additional writes incurred as a result of garbage collection and management of the BE PDs performed by code executing on the data storage system. Thus, $WA_m$ denotes the total writes performed by the data storage system in connection with writing new valid data (e.g., such as data written by a host) to a single unit of storage, such as a PLB, and includes the overhead or additional writes performed by the data storage system in connection with the LSS's garbage collection and management of the system's BE PDs in order to free the single unit of storage, such as the single PLB, given that the source PLBs from which the valid data is read have a certain utilization and associated percentage of free or unused capacity of the source PLBs.

As noted above, a non-volatile SSD, such as flash-based storage, can implement an internal LSS with respect to its physical storage. Internal garbage collection can be performed within the SSDs. Due to the nature of flash memory's operation, data cannot be directly overwritten as it can in a rotating disk drive such as a non-SSD hard disk drive. In at least one embodiment implementing flash-based SSDs, when data is first written to an SSD, the cells all start in an erased state so data can be written directly using pages at a time (often 4-8 kilobytes (KB) in size). In at least one embodiment, the SSD controller on the SSD, which manages the flash memory and interfaces with the data storage system, can use an SSD-internal logical to physical mapping system or layer similar to the mapping information, such as the mapping information of FIGS. 5 and 6. The data stored on the SSD can be assigned an SSD-based logical address that is mapped by the SSD's internal mapping information, or more generally metadata, to a corresponding physical storage location on the SSD. When new data comes in replacing older data already written, the SSD controller can write the new data in a new physical location and update the SSD's internal logical mapping information to point to the new physical location. The data in the old location is no longer valid, and will need to be erased before the old location can be written again.

With flash memory, data can be read or written (e.g., programmed) in writeable pages in a random access manner where the writeable page size can be a first size, such as 4 KB. However, flash memory can generally be erased in erasable blocks or erase blocks of typically a much larger second size, such as 256 KB. Thus each erasable block in this example can include 64 writeable or programmable 4 KB pages. When writing a writeable 4 KB page P1, for example, to a 256 KB block B1 and B1 has at least some valid data, the valid data is moved to another physical storage location before writing P1 to B1. In this manner, writing the single 4 KB page P1 to B1 can include performing the following sequence of steps: 1) moving or copying the valid data from B1 to another physical storage location; 2) erasing B 1; and 3) writing the new data P1 to B1. In an SSD such as a flash drive, the process of garbage collection includes the additional overhead of reading and rewriting data to the flash memory as just discussed. Thus, a new write from the host to write a new data page P1 can include a read of the block B1, a write of the pages of the block B1 which still include valid data to target block B2 (already erased), erasing B1, and then a write of the new data page P1 to B1. As needed, the SSD's internal mapping information can be updated. The foregoing additional overhead of garbage collection performed internally by the SSD when writing a new page P1 of data is similar to that as described above when the data storage system writes new data to a single PLB of the BE PDs.

Flash memory can be programmed and erased only a limited number of times. This is often referred to as the maximum number of program/erase cycles (P/E cycles) it can sustain over the life of the flash memory.

In a data storage system or DS which implements an LSS, such as described above for storing writes or updates to user data, the DS itself can perform GC as needed to obtain free contiguous chunks of storage such as non-volatile storage on the BE PDs. The GC performed by the DS can be done as a maintenance or background task as user logical addresses are overwritten or updated with multiple writes to the same logical address. In this case, the DS can perform GC to reuse the storage which contains old or invalid content that is replaced or updated with new content in the LSS. Consistent with other discussion herein, both valid content and invalid content can be stored within a first large contiguous chunk of storage whereby the DS can perform GC to move the valid content to a second chunk in order to free all storage within the first chunk. Such GC as performed by the DS results in write amplification denoting the extra or additional writes performed in connection with copying or moving valid content in order to obtain the contiguous free chunk of storage.

Additionally, the BE PDs can be SSDs where each such SSD or drive can internally implement an LSS managed internally by drive. As such, the SSD can also perform internal GC to obtain free erase blocks of storage available for reuse. Such internal GC within an SSD also results in write amplification. Thus, in such a system having two levels of LSSs—one managed by the DS and a second managed internally within each SSD—write amplification penalties are incurred by both LSSs.

One approach to reduce the SSD internal GC includes partitioning each SSD into virtual or logical zones each including multiple erase blocks. Each zone can denote a contiguous SSD-logical address range of storage. The DS can manage storage of its LSS such that storage within a single contiguous zone does not include any valid content or data. Put another way, the LSS of the DS can perform GC to move all valid content out of a first zone Z1 to a different second zone Z2 thereby making the first zone Z1 inactive or unused (e.g., does not store any valid content), and the second zone Z2 active or used (e.g., storing valid content). Subsequently, the DS can issue to the SSD an unmap command for the SSD logical address space associated with Z1 where the unmap command informs the SSD that Z1 does not contain any valid content and can be reused. In at least one system, the unmap command can be issued by the LSS of the DS to inform the SSD that the LSS of the DS is no longer using or storing content in the SSD logical address space associated with Z1. In this manner, unmapping Z1 indicates to the SSD that the SSD physical storage mapped to the logical address space of Z1 can be erased or freed by internal SSD storage management. If the erase blocks used by or mapped to Z1 are used only by Z1 and not shared with or mapped to any other SSD logical address space (e.g., not mapped to another zone), the physical storage associated with the unmapped Z1 can be erased and reused by the SSD without performing SSD-internal GC (e.g., without requiring copying valid content of another zone from a shared erase block). In this manner, the SSD-internal GC is reduced and results in improvements in SSD write performance and endurance.

However, a problem arises when writing to multiple zones of the same SSD in parallel or concurrently. Assume in a dual node system each node has multiple processing cores where the processing cores of each node write to a different zone. For example, assume node A and its processing cores write to zone Z1 of an SSD concurrently while node B and its processing cores write to zone Z2 of the same SSD. The underlying SSD is an LSS such that writes occurring in parallel or about the same time can be written sequentially or physically near each other on the SSD such that a first write W1 to address LA1 in Z1 and a second write W2 to address LA2 in Z2 can be stored in the same erase block B1 on the SSD physical storage media by the LSS of the SSD. Put another way, when the two nodes A and B write concurrently to different zones, a same single erase block B1 can be shared by multiple zones and can include valid content or data from the multiple different zones, such as Z1 and Z2, which are written to concurrently. As a result, when the DS issues an unmap command to unmap Z1, the SSD may still be required to perform GC to free or clear erase blocks of Z1 for reuse. For example, after issuing the above-noted unmap command to the SSD to unmap Z1, the GC performed internally by the SSD can include moving valid content of Z2 out of any erase blocks shared between Z1 and Z2 such as the erase block B1.

Generally, the number of zones within a single SSD, that are written concurrently, has a significant adverse performance impact and results in increases in write amplification as performed internally with the SSD. The more zones which are written concurrently, the more data blocks from different zones are mixed within the same erase blocks, which increases the required SSD internal GC data movements, increases the internal SSD write amplification, and degrades the system performance and drive endurance. For example, tests performed by the inventors have indicated that writing to two zones in parallel or concurrently on the same SSD may increase the internal SSD write amplification by as much as 65%, depending on various characteristics such as the SSD drive model, zone size, and the like, in comparison to writing to a single zone on the SSD. The foregoing provides a strong motivation to avoid writing to multiple zones in parallel or concurrently on the same SSD. Thus, straightforward approaches or alternatives include allowing concurrent and parallel writes to multiple zones which result in mixing data from different nodes within the same erase block thereby incurring additional write amplification and degraded performance. An alternative approach is to completely disallow or avoid writing to more than one zone concurrently or in parallel thereby typically incurring significant CPU and network overhead costs needed for synchronizing writes from multiple nodes or CPUs to the single zone, which may degrade the system performance.

Accordingly, described in the present disclosure are techniques which allow multiple nodes and processors or cores to write to the same SSD, and in particular, the same zone, concurrently in a synchronized manner. The techniques of the present disclosure provide for minimizing overhead costs incurred with respect to CPU and network resources. The techniques of the present disclosure further provide for minimal mixing of data from two different zones in the same erase block, which reduces the write amplification incurred by the SSD internal GC thereby resulting in improved performance and endurance. Thus in at least one embodiment, the techniques of the present disclosure do not completely disallow or completely avoid mixing of data from multiple zones on the same erase block but rather provide for reducing and minimizing instances where content from multiple zones is stored in the same erase block in efforts to reduce write amplification incurred by the SSD internal GC.

The foregoing and other aspects of the techniques of the present disclosure are described in more detail in the following paragraphs.

What will now be described are further details regarding one example of zones which are ubers in a data storage system in at least one embodiment in accordance with the techniques of the present disclosure.

Figure 7:
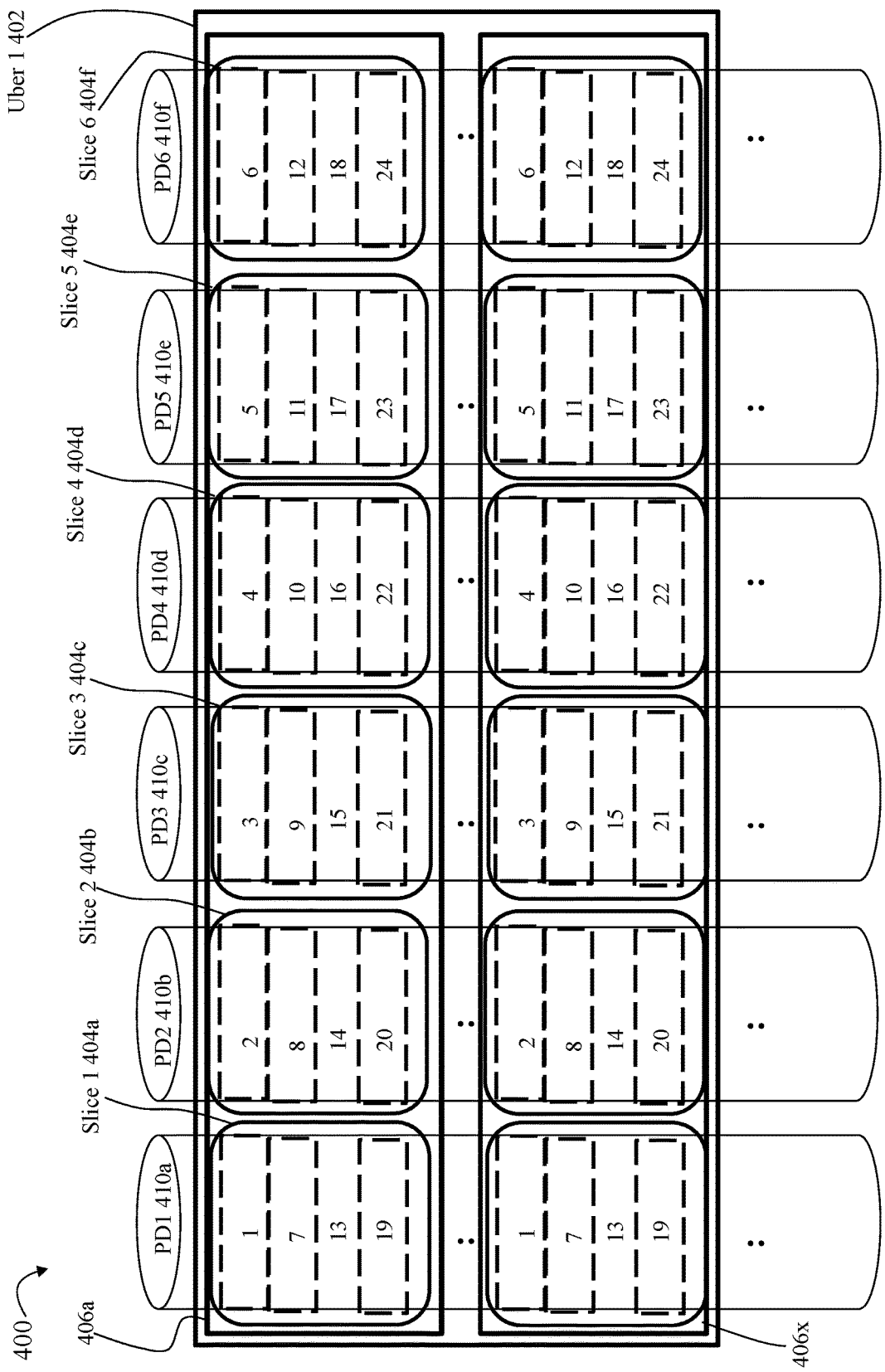
FIGS. 7 and 8 illustrate configuring multiple zones from non-volatile solid state drives (SSDs) in at least one embodiment in accordance with the techniques of the present disclosure.

Consistent with other discussion herein, at least one embodiment can include a distributed DS or storage system with two or more nodes each including a multi-core CPU. Each pair of adjacent nodes can share a DAE with drives providing non-volatile storage where such drives are SSDs. The SSDs can be BE PDs providing BE non-volatile storage for storing user data in an LSS managed by the DS. The BE PDs can be configured to use a data protection scheme such as, for example, RAID-5 or RAID-6 which is a parity protection scheme. Groups of SSDs can be configured into RAID groups based on the RAID protection scheme. For example, with a RAID-5 protection scheme, groups of SSDs can be configured to have K PDs or drives for storing user data and 1 additional PD or drive for storing parity information. With a RAID-6 protection scheme, groups of SSDs can be configured to have K PDs or drives for storing user data and 2 additional 2 PDs or drives for storing parity information. For purposes of illustration and as a non-limiting example, reference is made to FIG. 7 providing further detail regarding storage configuration in connection with a RAID-6 configuration of SSDs used to store user data in an LSS of the data storage system.

The example 400 illustrates 6 PDs 410*a-f* for a RAID-6 configuration with K=4 user data drives and 2 parity drives. Generally, the RAID group configuration of PDs 410*a-f* is organized in grids of fixed size blocks or chunks of storage also referred to herein as ubers. Each uber can generally include a grid organization with N rows and K+2 (e.g., RAID 6) columns. Each column is a separate physical drive, and one (RAID 5) or two (RAID 6) columns are designated as parity. For a RAID 6 group for example, each uber includes a subset of K+2 drives for storing the user data, where different ubers of the same RAID-6 group may have different K+2 drives for storing user data.

In the example 400, further detail is illustrated for uber 1 402 although the PDs 410*a-f* can include other ubers similarly configured. In the example 400, the uber 402 can include fixed slices of storage 404*a-f* across all 6 PDs. In at least one embodiment, each storage slice can be 4 GB of storage so that each uber can have a fixed storage capacity of 96 GB including a user data storage capacity of 64 GB and a parity storage capacity of 32 GB. For example, the uber 402 can be configured to store user data on PDs 410-*d* and associated parity information on PDs 410*e-f* Elements 406*a*-406*x* can each denote a row of 6 slices included in the uber 402 for a total of 24 slices (e.g., 24*4 GB=96 GB).

Each slice in an uber can be further divided into 4 equal 512 KB chunks or portions so that each row of slices, such as 406*a*, includes 24, 512 KB portions. For example, slice 404*a* includes 4, 512 KB portions 1, 7, 13 and 19; slice 404*b* includes 4, 512 KB portions 2, 8, 14 and 20; slice 404*c* includes 4, 512 KB portions 3, 9, and 21; slice 404*d* includes 4, 512 KB portions 4, 10, 16 and 22; slice 404*e* includes 4, 512 KB portions 5, 11, 17 and 23; and slice 404*f* includes 4, 512 KB portions 6, 12, 18 and 24.

A line or stripe of storage across all 6 PDS 410*a-f* can denote a PLB including 2 MB of compressed user data (on 4, 512 KB portions on 4 of the PDs) and include 1 MB of parity information (on 2, 512 KB portions of 2 of the PDs). In at least one embodiment, each fixed size 4 KB block of user data can be compressed separately, so a single PLB may contain more than 512 data blocks or user data blocks. For example with reference to FIG. 7, for a single PLB, the 2 MB of user data capacity can be provided by 4 chunks of storage (each 512 KB) between the four PDs 410*a-d*, and the 1 MB of parity storage can be provided by 2 chunks of storage (each 512 KB) on the two PDs 410*e-f* For example, chunks or portions 1-6 respectively on PDs 410*a-f* can denote storage of a first PLB; chunks or portions 7-12 respectively on PDs 410*a-f* can denote storage of a second PLB; chunks or portions 13-18 respectively on PDs 410*a-f* can denote storage of a third PLB; and chunks or portions 19-24 respectively on PDs 410*a-f* can denote storage of a fourth PLB.

In at least one data storage system using an LSS for writing user data, the data storage system can write to the BE PDs in full PLBs. Thus, the data storage system can be characterized as having a BE PD write granularity of a single PLB. Consistent with other discussion herein with an LSS in the data storage system, when a 4 KB data block of user data within an existing PLB is overwritten, the new 4 KB block of user data (compressed) can be written together with additional user data to a new, empty PLB. Thus, there is no in-place update of overwritten user data as stored on the BE PDs. Rather the existing PLB is marked as invalid or containing invalid content. The system uses a GC process which merges partially utilized PLBs (including both valid and invalid content) and writes valid content from the multiple source PLBs to new a destination or target PLB, thereby freeing the source PLBs. As a result, the free PLBs can be randomly spread in the drives, and therefore the storage system can randomly write to the free PLBs of the SSDs.

Generally, the random-write performance of SSDs is much lower than sequential writes. The reason is that the SSD writes data in "erase block" units, which must be completely erased before they can be rewritten. Overwrites of data within an erase block always go to new erase block. When the overwrites leaves holes, the SSD needs to work harder to free full erase blocks that can be erased and reused, as it needs to move valid content or data from one block to others as part of GC processing. When SSD GC processing moves more valid content or data internally within the SSD as part of GC, the result is an increase in additional writes and thus increased write amplification by the LSS of the SSD, where such increased write amplification directly reduces the SSD endurance, due to the limited number of NAND block writes which can be performed during the lifetime of the SSD.

For purposes of illustration of the techniques of the present disclosure, following examples reference a dual node system where each node can include multiple cores and/or multiple processors and where both nodes can write to a single SSD. More generally, the techniques of the present disclosure are not so limited and can be generalized, for example, for use with two or more nodes and more than a single SSD.

In at least one embodiment in accordance with the techniques of the present disclosure, an SSD can be shared and accessible for storing user data in an LSS implemented by the data storage system. Both nodes can write to the same SSD and each node can include multiple cores or processors. For example, in at least one embodiment, each node can include 20 processing cores for a total of 40 processing cores in the system. All 40 cores can write to the same SSD, and more specifically, to the same virtual zone in the same SSD. In at least one embodiment, the 40 cores can be allowed to write concurrently or in parallel to the same single zone on the same SSD.

Generally, the SSD, or more generally, one or more SSDs can be partitioned into zones, sometimes referred to as virtual zones, where each such zone is associated with a particular portion of the one or more SSDs. In at least one embodiment with reference to FIG. 7, each zone can correspond to an uber such that multiple ubers can be configured from the same set of PDs or SSDs as well as different PDs or SSDs.

Figure 8:
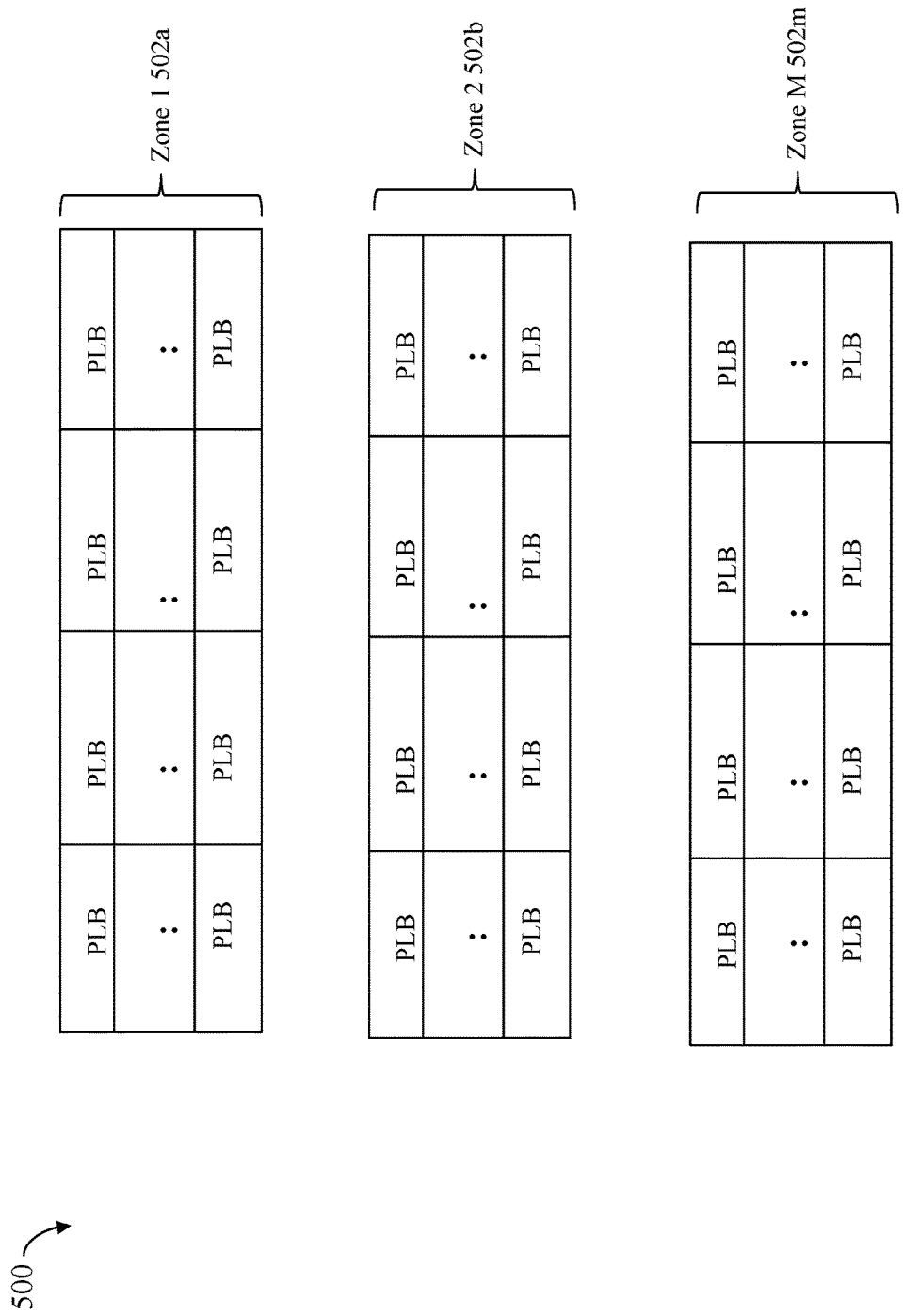

Referring to FIG. 8, shown is an example 500 more generally illustrating zones of storage of SSDs in at least one embodiment in accordance with the techniques of the present disclosure.

The example 500 includes M zones 502*a-m*, where each of the M zones can be a fixed size such as 96 GB of storage capacity. In at least one embodiment each of the M zones 502a-m can be a single uber such as described in connection with FIG. 7. In at least one embodiment described in more detail below, two nodes can concurrently or in parallel write to PLBs in the same single zone. Each zone can be assigned a unique index to uniquely identify the zone from the remaining zones.

In at least one embodiment, the two nodes can both concurrently write to the same zone and can generally both allocate storage for PLBs from the same zone. In connection with allocation of PLBs from the same zone for two nodes, a boundary can be set within the zone. For example, the zone can be partitioned into two portions so that each node is associated or assigned exclusive use of 50% of the zone. Each node can handle allocation and use of its assigned portion of the zone independently of the other node without requiring synchronization with its peer node. In at least one embodiment, no synchronization between the nodes using the same zone of storage is needed until one of the nodes has allocated or utilized a threshold amount or percentage of its portion of the zone's storage. When one of the nodes consumes, allocates or uses the threshold amount of its portion of the zone storage, the nodes can communicate to select a new boundary. In at least one embodiment, the new boundary for the zone can be determined based on the actual write rate of each node. The foregoing can continue until a minimum predefined threshold of available space left in the zone is reached, where the remaining space can be finally divided between the nodes. The predefined minimum threshold can be any suitable value. In at least one embodiment, the predefined minimum threshold can be sufficiently small so that that the possible mixing of content or data within the same erase block is small and is expected to have no or minimal impact on the write amplification. Additionally, the predefined minimum threshold can be selected to not be too small in order to reduce and minimize the overhead of CPU and network resources incurred when synchronizing a new boundary between nodes.

In connection with allocation of PLBs by each node from its exclusive portion of an active zone, an allocation on demand technique can be utilized. In at least one embodiment, a PLB can be allocated from the currently active zone only after the content to be stored to the PLB is actually formed and stored in memory. For example, as discussed elsewhere herein, content written to a single PLB can include content of many user data blocks of many user write operations. Temporarily the write data (user data or content) to be destaged from the log to the BE PDs, which are SSDs, can be stored in a buffer in memory to form the 2 MB of user data, where the buffer of data can then be stored in a single PLB on the SSD. Put another way, destaging write data from records of the log can include temporarily storing the write data (such as in compressed form) in memory in a 2 MB buffer, and then writing the 2 MB buffer of data to a single PLB on the SSD. In at least one embodiment, storage of the PLB may not be allocated until the 2 MB of data is in its compressed form in the memory buffer and ready to be written out to the PLB. Such an allocation on demand scheme avoids a situation of a first zone becoming falsely "full" (i.e., all PLBs are allocated), but where content of the actual PLBs of the first zone is written after other PLBs may have been allocated and written to in a next second zone.

In at least one embodiment, each node can include an allocator component responsible for allocating PLBs from the node's portion of the currently active zone. The currently active zone can denote the particular zone which is actively being used by the node for PLB allocation. The allocator component of each node can keep the following persistent parameters:

1. ActiveZoneIndex: The index of the current active zone from which the node is allocating PLBs. In at least one embodiment, each node can allocate PLBs only from the single active zone as determined based on the nodes current value of ActiveZoneIndex. In such an embodiment, the node may not allocate PLBs from other zones other than the single active zone.

2. NextActiveZoneIndex: The index of the next active zone. As will be described below, the next active zone can be selected before the current active zone is full, therefore the NextActiveZoneIndex value indicates the next active zone from which the node will allocate PLBs.

3. ActiveZoneBoundaryIndex: The boundary within the current active zone, which divides the PLBs between the nodes. In at least one embodiment, the ActiveZoneBoundaryIndex can be any suitable value denoting the boundary within the current active zone. In at least one embodiment, PLBs having an associated logical offset, location or address in the active zone before this value may be allocated by the first node, while PLBs after this value may be allocated by the second node. Thus, the logical address space or offset range of a single zone can be partitioned into two portions, where the logical address space has an associated range with a starting range offset and ending range offset, and where the ActiveZoneBoundaryIndex can be some value in the range. A first portion of the zone can be defined having a lower bound equal to the starting range offset and an upper bound equal to the ActiveZoneBoundaryIndex-1. A second portion can be defined having a lower bound equal to the ActiveZoneBoundaryIndex and an upper bound equal to the ending range offset. PLBs having associated logical addresses, locations or offsets in the first portion can be allocated by the first node and PLBs having associated logical addresses, location or offsets in the second portion can be allocated by the second node.

4. NextActiveZoneBoundaryIndex: This is similar in concept to the "NextActiveZoneIndex", where the NextActiveZoneBoundaryIndex indicates the boundary that divides the PLBs between the nodes for the next active zone (identified by the NextActiveZoneIndex).

5. NumPlbsAllocated: This is a counter indicating how many PLBs the node has actually allocated from the active zone In at least one embodiment, the allocator component of each node can independently record, persistent and maintain its own node-local copy of the foregoing parameters.

The nodes can communicate to pick the first active zone and assign an initial value to "ActiveZoneIndex", and can initially set the "ActiveZoneBoundaryIndex" to the middle of the first selected active zone. For example, if the zone holds 8k PLBs, the ActiveZoneBoundaryIndex can be set to 4k, indicating the first half or 4k PLBs may be allocated only by Node A, while the second half or 4k PLBs may be allocated only by Node B. Both nodes can also initialize or set their local copies of NumPlbsAllocated to 0. The values that belong to the next active zone (NextActiveZoneIndex, NextActiveZoneBoundaryIndex) can be set to invalid values.

In at least one embodiment, when any system component of a node wants to write a PLB, the component can first prepare the content to be stored in the PLB in node-local memory, and only then does the node allocate a PLB from the currently active zone. Allocation of a PLB within a node from the node's portion of a zone can be performed by incrementing the node's counter, NumPlbsAllocated. In at least one embodiment, the value of NumPlbsAllocated after the increment can be the index of the allocated PLB within the node's portion of the zone. In at least one embodiment, allocation of PLBs by each node can be in opposite directions with respect to the PLB index, offset or location within the zone. For example, node A can allocate from the beginning of its portion; and node B can allocate from the end of its portion. For example, assume the zone has 1000 PLBs and the first portion of node A has 500 PLBs with corresponding associated PLB indices 1-500, and the second portion of node B has 500 PLBs with corresponding PLB indices 501-1000. Assuming the NumPlbsAllocated=0 for node A, node A can allocate PLB 1 from its first portion of the active zone by incrementing NumPlbsAllocated to 1. Assuming the NumPlbsAllocated=0 for node B, node B can allocate PLB 1000 from its second portion of the active zone by incrementing NumPlbsAllocated to 1. For node B, the allocated PLB can have an associated index which is 1000 which can be calculated, for example, using the largest PLB index of the active zone and the NumPlbAllocated either before or after the increment. For example, the PLB index of the allocated PLB 1000 by node B can be calculated as "1000-(NumPlbsAllocated-1)", using NumPlbsAllocated value after incrementing for allocation.

In at least one embodiment, the techniques of the present disclosure do not require any further communication between the nodes, until one of them approaches the ActiveZoneBoundaryIndex. In at least one embodiment, a predefined threshold such as a predefined percentage can be specified. In order to avoid allocation delay, when any of the nodes has allocated a predefined percentage (e.g., 90%) of its portion, the node can communicate with the other node in order to set a new boundary (e.g., new value for ActiveZoneBoundaryIndex) within the current active zone. The node that reaches the predefined threshold can communicate its state, regarding reaching the predefined percentage or threshold, to the other node. For example, assume node A reached the predefined threshold. In response, node A can communicate its state to node B where node A can send such state information to node B including information regarding node A's percentage or amount of PLBs consumed within the active zone. For example, if node A has consumed 90% of its portion of PLBs, node A can communicate the 90% value to node B. In response, the other peer node B can reply with the new boundary denoting an updated value for ActiveZoneBoundaryIndex. Thus in at least one embodiment, the peer node B can calculate and determine the updated value for ActiveZoneBoundaryIndex. In at least one embodiment, the revised or new ActiveZoneBoundaryIndex value can be in proportion to the write rate of each node, according to the actual NumPlbsAllocated value of each node.

Figure 9:
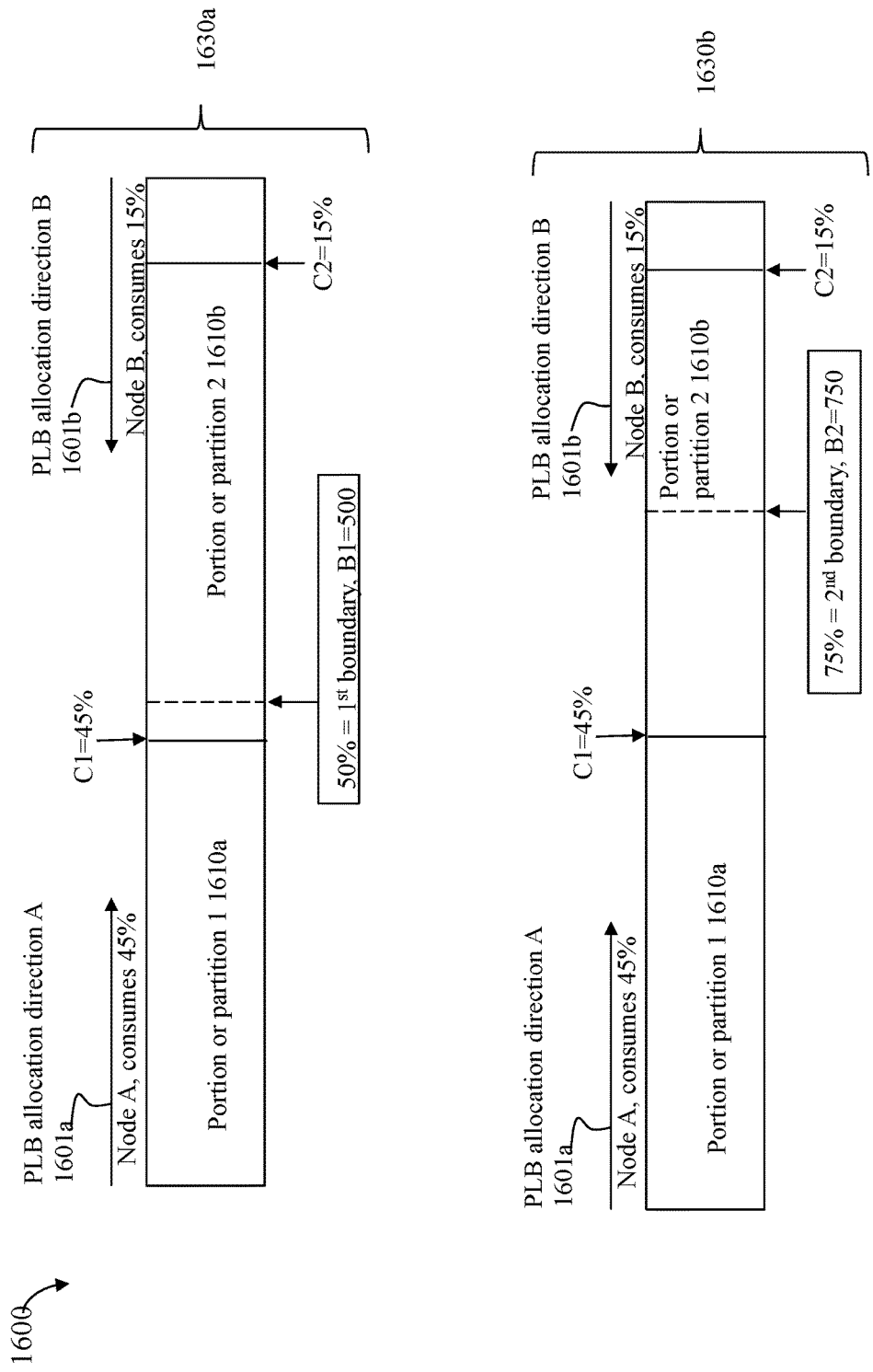
FIG. 9 is an example of illustrating use of the techniques of the present disclosure in at least one embodiment.

To further illustrate, reference is now made to the example 1600 of FIG. 9. Assume for purposes of illustration of FIG. 9 that the active zone has 1000 PLBs. Consistent with discussion above, assume that the first ActiveZoneBoundary Index value or $1^{st}$ boundary is set to the middle of the active zone evenly divided between nodes A and B so that the $1^{st}$ boundary of 50% denoted PLB 500 so that PLBs 1-500 are in a first portion assigned for exclusive use by node A, and the remaining PLBs 501-1000 are in a second portion assigned for exclusive use by node B. The element 1630a can denote the state of PLB allocation and consumption at a first point in time T1 where node A has consumed 45% of the active zone or 90% of its first portion of share 1610a; and where node B has consumed 15% of the active zone or 30% of its second portion of share 1610b. B1 of element 1630a can denote the $1^{st}$ boundary, where B1=50% or 500 (in terms of PLB index values). Element 1601a indicates the allocation direction of PLBs by node A within its assigned portion 1610a, and element 1601b indicates the allocation direction of PLBs by node B within its assigned portion 1610b. For example, node A can allocate PLBs in sequential order having indices, 1, 2, 3, 4, etc.; and node B can allocate PLBs in sequential order having indices 1000, 999, 998, etc. In this manner, node A can be characterized as allocating PLBs based on consecutively sequentially increasing PLB indices in the zone from the zone's starting offset=1; and node B can be characterized as allocating PLBs based on consecutively sequentially decreasing PLB indices in the zone beginning with the zone's ending offset 1000.

At the time T1 in the example 1600, node A can determine it has consumed 45% of the active zone which is equal to 90% of its portion 1610a (e.g., 90%*50%=45% of the entire active zone). Node B can determine it has consumed 15% of the entire active zone which is equal to 30% of its portion 1610b (e.g., 30%*50%=15% of the entire active zone). Assume, for example, that the predefined threshold is 90% with respect to a node's share of its portion of PLBs. In this case, node A can determine it has reached the predefined threshold of 90% and can notify node B regarding node A's state. In at least one embodiment, node A can communicate to node B the current consumed amount of PLBs of node A's portion 1610a. For example, node A can tell node B that node A has consumed 90% of its assigned portion 1610a. In response, node B can calculate the relative write rate, consumption rate or allocation rate of PLBs of node A with respect to node B. At the first point in time T1 denoted by 1630a, node B can determine that node A has a write rate or consumption rate of PLBs which is three times that of node B (e.g., during the current time period ending at time T1, node A has consumed 90% of its share or portion 610a and node B has consumed 30% of its share or portion 1610b). In this case, the new ActiveZoneBoundaryIndex value or $2^{nd}$ boundary B2 can be set to ¾ or 75% of the remaining 40% of unconsumed PLBs of the zone (e.g., 45%+(¾* 40%)=75%). The element 1630b illustrates the revised or updated 2nd boundary B2=75% or 750 (in terms of PLB index value). Thus, the boundary of the active zone can be dynamically adjusted based on the consumption rates, allocation rates or write rates of the nodes sharing the active zone.

The foregoing processing of updating the current zone boundary by determining a new value for ActiveZoneBoundaryIndex can be repeated until, at a boundary update time, R2 denoting a predefined minimum free space threshold remaining in the zone is reached. For example R2 can be specified as a percentage such as 5%. When setting or updating the boundary of the current zone, if a determination is made that the zone does not include an amount of free or unconsumed storage space which is larger than R2, the remaining unused or unconsumed storage space can be finally divided between the two nodes A and B. Additionally, at this final division of the remaining storage of the current active zone, the NextActiveZoneIndex can be selected; and the NextActiveZoneBoundaryIndex can also be set. In at least one embodiment, the NextActiveZoneBoundaryIndex can also be set according to the relative write rates, allocation rates or consumption rates of PLBs by the nodes as described above.

When each node has allocated all PLBs from its portion of share of the active zone denoted by ActiveZoneIndex, the node can switch to the next zone identified by the node's NextActiveZoneIndex value. Switching to the next zone can include: updating the ActiveZoneIndex to be the zone denoted by the NextActiveZoneIndex (as maintained by the node); updating the ActiveZoneBoundaryIndex to the current value of NextActiveZoneBoundaryIndex (as maintained by the node); invalidating the values for the next zone (e.g., invalidating NexActiveZoneIndex and NextActiveZoneBoundaryIndex); and resetting or reinitializing NumPlbsAllocated to 0.

The foregoing describes techniques for maximizing performance and endurance by allowing multiple nodes, or more generally, multiple cores, multiple processors or multiple consumers, to share a single active zone where such multiple consumers can write to the same single zone concurrently or in parallel. The techniques minimize additional overhead incurred in connection with internode communication to synchronize usage of the same single zone. The techniques described in the present disclosure also limit the possible impact of mixing data or content of different zones within the same erase block by minimizing or limiting the times when the two nodes write concurrently or in parallel to different zones.

In at least one embodiment, each node can only be allowed to allocate PLBs from its assigned portion of the current active zone as indicated by the node's local copy of ActiveZoneIndex. After the final division or partitioning of the active zone between the nodes as part of the final update to the active zone's boundary, each node can also independently switch to the next zone as denoted by the node's local copy of NextActiveZoneIndex in response to consuming the node's portion of the final remaining storage of the active zone.

In some systems, the number of SSDs or drives and RAID configuration may allow different ubers to be configured from different drives so that uber U1 and uber U2 do not have any drives in common. Put another way, the set intersection of first SSDs used to configure U1 and second SSDs used to configure U2 can be empty. To further illustrate, a system can have 24 SSDs configured using an 8×1 RAID-5 configuration (with 8 SSDs of user data and 1 SSD for parity). U1 can be configured based on this 8×1 RAID-5 configuration from slices of storage on SSDs 0-8 while U2 can be configured based on this 8×1 RAID-5 configuration from slices of storage on SSD 9-17. In this case, the system can write to the 2 ubers U1 and U2 concurrently or in parallel without any need for synchronization. In such an embodiment, the techniques described above can be utilized while omitting or eliminating the need to adjust or set boundaries within the same zone.

The foregoing illustrates use of the techniques of the present disclosure with respect to two nodes. More generally, the techniques of the present disclosure can be used in connection with two or more nodes or consumers, where each node or consumer can have multiple CPUs and/or processor cores consuming storage of the shared zone. In such an embodiment having more than two nodes or consumers, the boundaries of the active zone can be adjusted in any suitable manner.

Figure 10A:
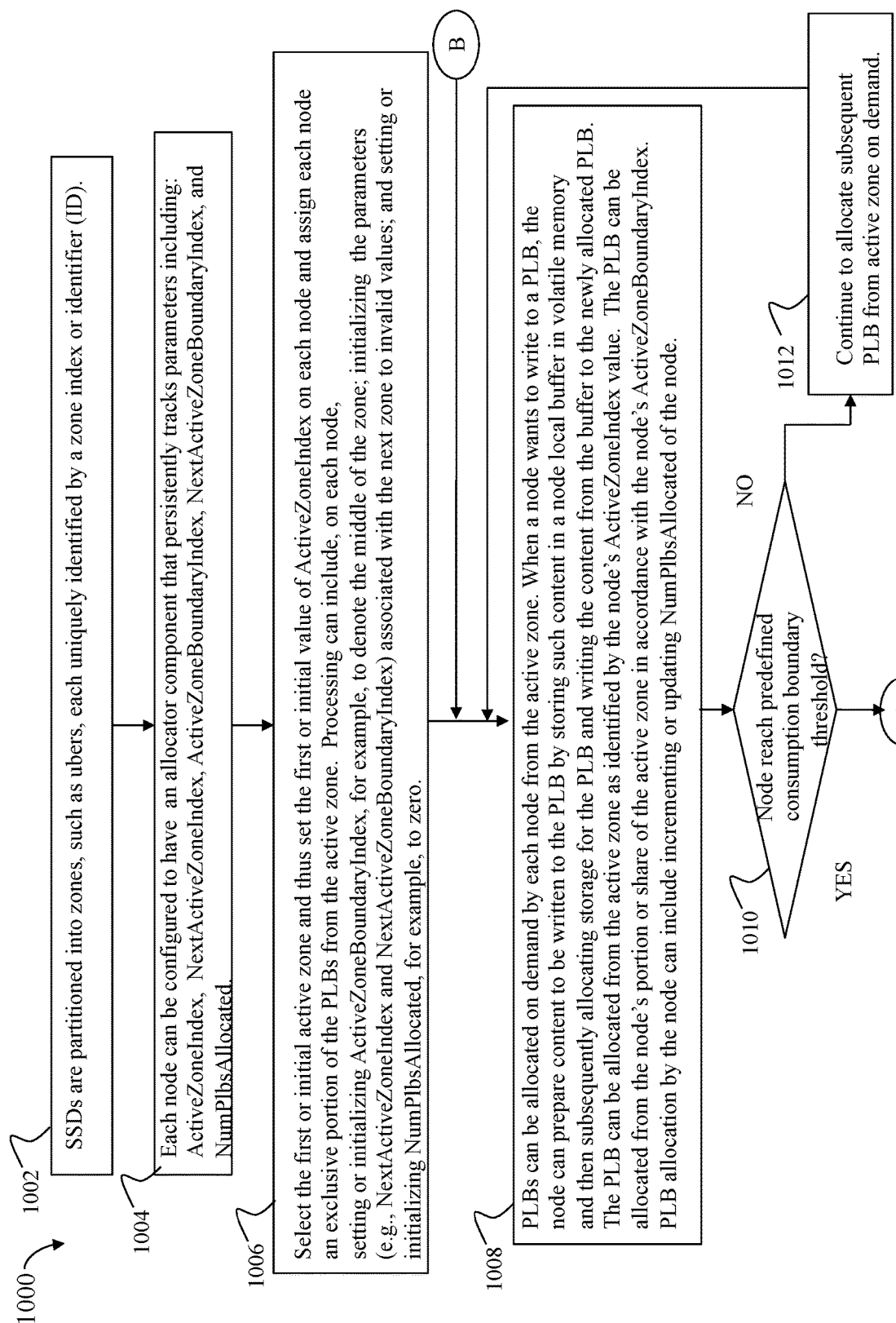
FIGS. 10A, 10B and 10C are flowcharts of processing steps that can be performed in at least one embodiment in accordance with the techniques of the present disclosure.
Figure 10B:
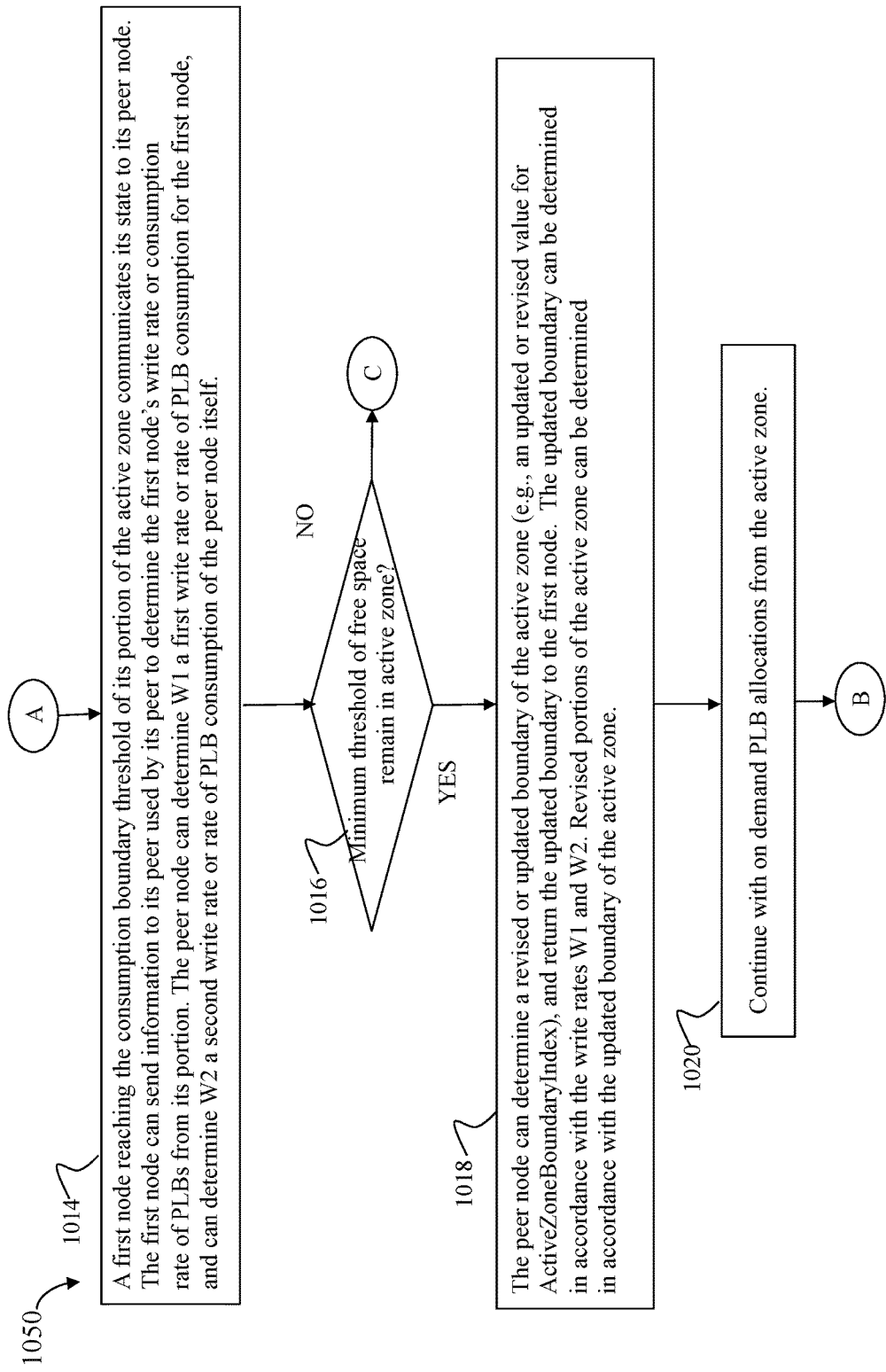
Figure 10C:
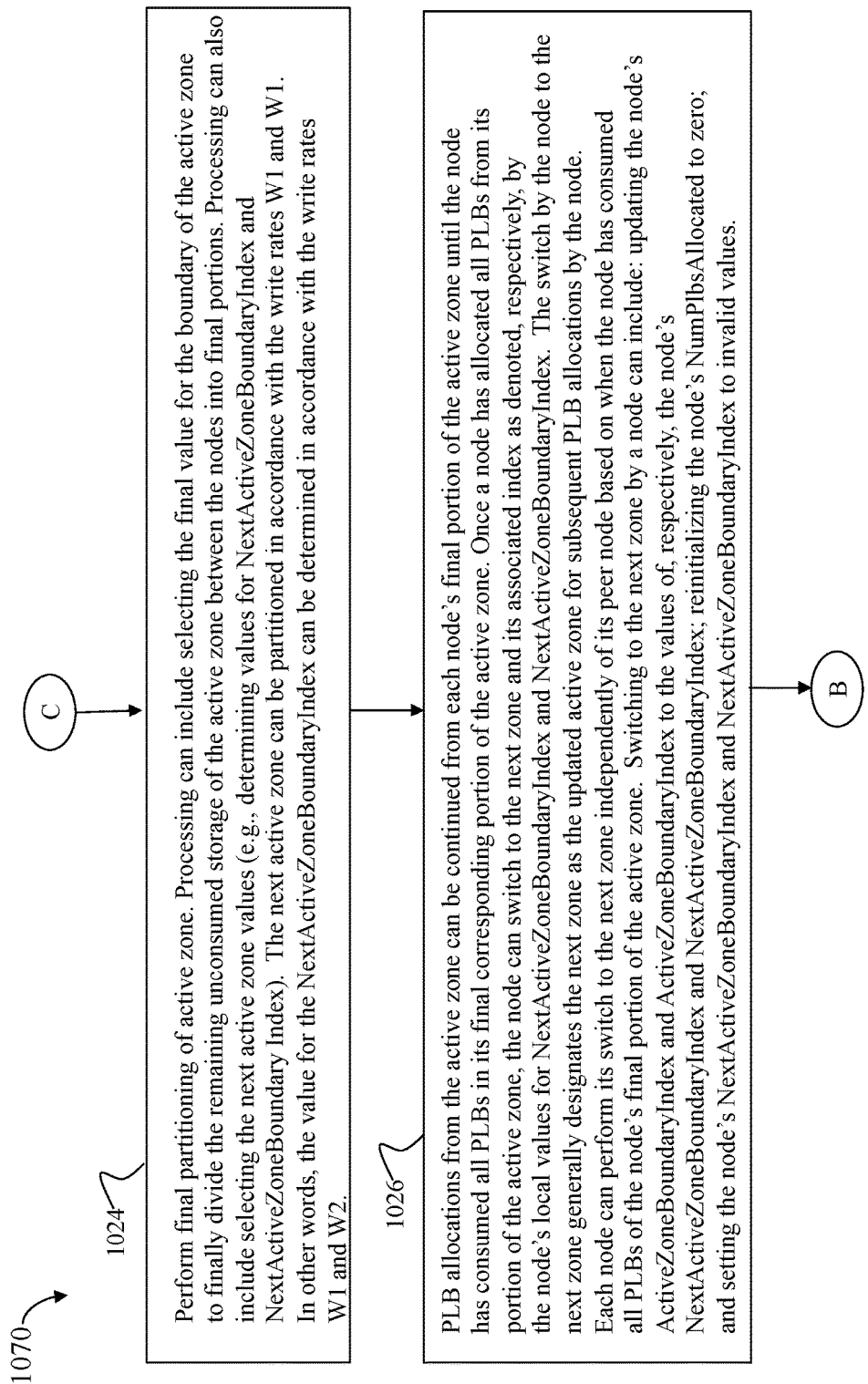

Referring to FIGS. 10A-10C, shown is a flowchart comprising steps of 1000, 1050 and 1070 which can be performed in at least one embodiment in accordance with the techniques of the present disclosure. FIGS. 10A-10C summarize processing described above.

At the step 1002, SSD can be partitioned into zones, such as ubers, each uniquely identified by a zone index or identifier (ID). From the step 1002, control proceeds to the step 1004.

At the step 1004, node can be configured to have an allocator component that persistently tracks parameters including: ActiveZoneIndex, NextActiveZoneIndex, ActiveZoneBoundaryIndex, NextActiveZoneBoundaryIndex, and NumPlbsAllocated. From the step 1004, control proceeds to the step 1006.

At the step 1006, processing can include selecting the first or initial active zone and thus set the first or initial value of ActiveZoneIndex on each node and assign each node an exclusive portion of the PLBs from the active zone. Processing can include, on each node, setting or initializing ActiveZoneBoundaryIndex, for example, to denote the middle of the zone; initializing the parameters (e.g., NextActiveZoneIndex and NextActiveZoneBoundaryIndex) associated with the next zone to invalid values; and setting or initializing NumPlbsAllocated, for example, to zero. From the step 1006, control proceeds to the step 1008.

At the step 1008, PLBs can be allocated on demand by each node from the active zone. When a node wants to write to a PLB, the node can prepare content to be written to the PLB by storing such content in a node local buffer in volatile memory and then subsequently allocating storage for the PLB and writing the content from the buffer to the newly allocated PLB. The PLB can be allocated from the active zone as identified by the node's ActiveZoneIndex value. The PLB can be allocated from the node's portion or share of the active zone in accordance with the node's ActiveZoneBoundaryIndex. PLB allocation by the node can include incrementing or updating NumPlbsAllocated of the node. From the step 1008, control proceeds to the step 1010.

At the step 1010, after an allocation of a PLB is made from a node's portion of the active zone, processing can determine whether the node (for which a PLB has just been allocated in the step 1008) has reached a predefined consumption boundary threshold with respect to the node's portion of the active zone. If the step 1010 evaluates to no, control proceeds to the step 1012 to continue with processing to allocate subsequent PLBs for the node on demand from the node's portion or share of the active zone. From the step 1012, control proceeds to the step 1008. If the step 1010 evaluates to yes, control proceeds to the step 1014.

At the step 1014, a first node which has reached the consumption boundary threshold of the node's portion of the active zone communicates its state to its peer node. The first node can send information to its peer used by its peer to determine the first node's write rate or consumption rate of PLBs from its portion. The peer node can determine W1 a first allocation rate, write rate or rate of PLB consumption for the first node, and can determine W2 a second allocation rate, write rate or rate of PLB consumption of the peer node itself. From the step 1014, control proceeds to the step 1016.

At the step 1016, a determination can be made as to whether there is at least a minimum threshold amount of free space remaining in the active zone. If the step 1016 evaluates to yes, control proceeds to the step 1018. At the step 1018, the peer node can determine a revised or updated boundary of the active zone (e.g., an updated or revised value for ActiveZoneBoundaryIndex), and return the updated boundary to the first node. The updated boundary can be determined in accordance with the allocation rates, consumption rates, or write rates W1 and W2. Revised portions of the active zone can be determined in accordance with the updated boundary of the active zone. From the step 1018, processing can continue with PLB on demand allocations for the nodes from their respective revised portions of the active zone based on the updated boundary of the active zone. From the step 1018, control proceeds to the step 1008.

If the step 1016 evaluates to no, control proceeds to the step 1024. At the step 1024, the final partitioning of the active zone can be performed. Processing can include selecting the final value for the boundary of the active zone to finally divide the remaining unconsumed storage of the active zone between the nodes into final portions. Processing can also include selecting the next active zone values (e.g., determining values for NextActiveZoneBoundaryIndex and NextActiveZoneBoundary Index). The next active zone can be partitioned in accordance with the rates W1 and W2 denote respective PLB allocation, write or consumption rates by the nodes. In other words, the value for the NextActiveZoneBoundaryIndex can be determined in accordance with the rates W1 and W2. From the step 1024, control proceeds to the step 1026.

At the step 1026, PLB allocations from the active zone can be continued from each node's final portion of the active zone until the node has consumed all PLBs in its final corresponding portion of the active zone. Once a node has allocated all PLBs from its portion of the active zone, the node can switch to the next zone and its associated index as denoted, respectively, by the node's local values for NextActiveZoneBoundaryIndex and NextActiveZoneBoundaryIndex. The switch by the node to the next zone generally designates the next zone as the updated active zone for subsequent PLB allocations by the node. Each node can perform its switch to the next zone independently of its peer node based on when the node has consumed all PLBs of the node's final portion of the active zone. Switching to the next zone by a node can include: updating the node's ActiveZoneBoundaryIndex and ActiveZoneBoundaryIndex to the values of, respectively, the node's NextActiveZoneBoundaryIndex and NextActiveZoneBoundaryIndex; reinitializing the node's NumPlbsAllocated to zero; and setting the node's NextActiveZoneBoundaryIndex and NextActiveZoneBoundaryIndex to invalid values. From the step 1026, control proceeds to the step 1008.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
    partitioning a plurality of non-volatile solid state drives (SSDs) into a plurality of zones;
    for a first zone of the plurality of zones, partitioning the first zone into a first portion and a second portion, wherein the first portion is assigned to a first node for allocating physical blocks of storage used exclusively by the first node, and wherein the second portion is assigned to a second node for allocating physical blocks of storage used exclusively by the second node, wherein a first boundary denotes a boundary partitioning the first zone into the first portion and the second portion;
    maintaining, by each of the first node and the second node, a plurality of parameters used exclusively by said each node, wherein the plurality of parameters includes a first parameter denoting the first zone as an active zone to be used for allocating physical blocks of storage for said each node, wherein the plurality of parameters includes a second parameter identifying the first boundary as an active zone boundary in the active zone denoted by the first parameter, wherein said each node only allocates physical storage blocks from a corresponding portion of the active zone denoted by the first parameter, wherein the corresponding portion of the active zone of said each node is in accordance with the active zone boundary identified by the second parameter;
    allocating, for the first node, a first plurality of physical blocks from the first portion used exclusively by the first node;
    determining that the first node has consumed a threshold amount of the first portion of the first zone; and
    responsive to determining the first node has consumed the threshold amount of the first portion of the first zone, dynamically determining a second boundary denoting a repartitioning of the first zone into a revised first portion and a revised second portion, wherein the revised first portion is assigned to the first node for allocating physical blocks of storage used exclusively by the first node, wherein the revised second portion is assigned to the second node for allocating physical blocks of storage used exclusively by the second node.

2. The computer-implemented method of claim 1, wherein a first plurality of parameters denotes the plurality of parameters used exclusively by the first node, and wherein a second plurality of parameters denotes the plurality of parameters used exclusively by the second node.

3. The computer-implemented method of claim 2, further comprising:
    updating the second parameter of the first plurality of parameters, used exclusively by the first node, to identify the second boundary; and
    updating the second parameter of the second plurality of parameters, used exclusively by the second node, to identify the second boundary.

4. The computer-implemented method of claim 2, wherein said second boundary is determined in accordance with a first rate at which the first node allocates, consumes or writes to physical blocks from the first portion of the first zone, and in accordance with a second rate at which the second node allocates, consumes or writes to physical blocks from the second portion of the first zone.

5. The computer-implemented method of claim 4, wherein the first boundary denotes a middle of the first zone wherein the first portion and the second portion each include the same number of physical blocks.

6. The computer-implemented method of claim 5, wherein the first rate is greater than the second rate, and wherein the second boundary provides for repartitioning the first zone resulting in the first revised portion having more physical blocks of storage than the second revised portion.

7. The computer-implemented method of claim 6, further comprising:

determining whether the first zone includes at least a minimum amount of free storage; and responsive to determining that the first zone does not includes at least the minimum amount of free storage, performing first processing including:

performing a final partitioning of the first zone in accordance with a final boundary for the first zone, wherein the final boundary partitions the first zone into a first final portion and a second final portion, wherein the first final portion is assigned to the first node for allocating physical blocks of storage used exclusively by the first node, and wherein the second final portion is assigned to the second node for allocating physical blocks of storage used exclusively by the second node.

8. The computer-implemented method of claim 7, wherein said final boundary is determined in accordance with a third rate at which the first node allocates, consumes or writes to physical blocks of storage from the first final portion of the first zone, and in accordance with a fourth rate at which the second node allocates, consumes or writes to physical blocks of storage from the second final portion of the first zone.

9. The computer-implemented method of claim 7, wherein the first processing includes:

selecting a second zone of the plurality of zones as a next zone;

assigning the second zone to a third parameter of each of the first plurality of parameters and the second plurality of parameters;

selecting a second zone boundary partitioning the second zone into a third portion and a fourth portion; and assigning the second zone boundary to a fourth parameter of each of the first plurality of parameters and the second plurality of parameters.

10. The computer-implemented method of claim 9, further comprising:

subsequent to performing said first processing, determining that the first node has allocated all physical blocks of storage from the first final portion; and responsive to determining that the first node has allocated all physical blocks of storage from the first final portion, performing second processing by the first node, said second processing including:

assigning the current value of the third parameter of the first plurality of parameters used by the first node to the first parameter of the first plurality of parameters used by the first node, wherein the current value of the third parameter identifies the second zone, and wherein said assigning the current value of the third parameter of the first plurality thereby updates the active zone of the first node to be the second zone; and assigning the current value of the fourth parameter of the first plurality of parameters used by the first node to the second parameter of the first plurality of parameters used by the first node, wherein the current value of the fourth parameter identifies the second zone boundary, and wherein said assigning the current value of the fourth parameter of the first plurality thereby updates the active zone boundary of the first node to be the second zone boundary and indicates that the active zone is partitioned into the third portion and the fourth portion, wherein the third portion is assigned to the first node for allocating physical blocks of storage used exclusively by the first node, and wherein the fourth portion is assigned to the second node for allocating physical blocks of storage used exclusively by the second node.

11. The computer-implemented method of claim 1, further comprising:

subsequent to said dynamically determining the second boundary, allocating a physical block of storage for the first node from the first revised portion.

12. The computer-implemented method of claim 1, wherein the method is performed in a data storage system which implements a log structured system (LSS), wherein a log of the LSS includes a plurality of records each denoting a recorded write operation, wherein the method includes:

flushing the plurality of records from the log, wherein the plurality of records corresponds to a plurality of write operations recorded in the log; and responsive to said flushing, storing content written by the plurality of write operations to the plurality of SSDs.

13. The computer-implemented method of claim 12, wherein the plurality of write operations are received by the first node, and wherein said allocating, for the first node, the first plurality of physical blocks from the first portion used exclusively by the first node, is performed responsive to receiving the plurality of write operations.

14. The computer-implemented method of claim 13, further comprising:

storing, by the first node, content written by the plurality of write operations to the first plurality of physical blocks.

15. The computer-implemented method of claim 14, wherein each of the plurality of non-volatile SSDs implements a second LSS internally in said each SSD.

16. A system comprising:

one or more processors; and a memory comprising code stored thereon that, when executed, performs a method comprising:

partitioning a plurality of non-volatile solid state drives (SSDs) into a plurality of zones;

for a first zone of the plurality of zones, partitioning the first zone into a first portion and a second portion, wherein the first portion is assigned to a first node for allocating physical blocks of storage used exclusively by the first node, and wherein the second portion is assigned to a second node for allocating physical blocks of storage used exclusively by the second node, wherein a first boundary denotes a boundary partitioning the first zone into the first portion and the second portion;

maintaining, by each of the first node and the second node, a plurality of parameters used exclusively by said each node, wherein the plurality of parameters includes a first parameter denoting the first zone as an active zone to be used for allocating physical blocks of storage for said each node, wherein the plurality of parameters includes a second parameter identifying the first boundary as an active zone boundary in the active zone denoted by the first parameter, wherein said each node only allocates physical storage blocks from a corresponding portion of the active zone denoted by the first parameter, wherein the corresponding portion of the active zone of said each node is in accordance with the active zone boundary identified by the second parameter;

allocating, for the first node, a first plurality of physical blocks from the first portion used exclusively by the first node;

determining that the first node has consumed a threshold amount of the first portion of the first zone; and responsive to determining the first node has consumed the threshold amount of the first portion of the first zone, dynamically determining a second boundary denoting a repartitioning of the first zone into a revised first portion and a revised second portion, wherein the revised first portion is assigned to the first node for allocating physical blocks of storage used exclusively by the first node, wherein the revised second portion is assigned to the second node for allocating physical blocks of storage used exclusively by the second node.

17. A non-transitory computer readable medium comprising code stored thereon that, when executed, performs a method comprising:

partitioning a plurality of non-volatile solid state drives (SSDs) into a plurality of zones;

for a first zone of the plurality of zones, partitioning the first zone into a first portion and a second portion, wherein the first portion is assigned to a first node for allocating physical blocks of storage used exclusively by the first node, and wherein the second portion is assigned to a second node for allocating physical blocks of storage used exclusively by the second node, wherein a first boundary denotes a boundary partitioning the first zone into the first portion and the second portion;

maintaining, by each of the first node and the second node, a plurality of parameters used exclusively by said each node, wherein the plurality of parameters includes a first parameter denoting the first zone as an active zone to be used for allocating physical blocks of storage for said each node, wherein the plurality of parameters includes a second parameter identifying the first boundary as an active zone boundary in the active zone denoted by the first parameter, wherein said each node only allocates physical storage blocks from a corresponding portion of the active zone denoted by the first parameter, wherein the corresponding portion of the active zone of said each node is in accordance with the active zone boundary identified by the second parameter;

allocating, for the first node, a first plurality of physical blocks from the first portion used exclusively by the first node;

determining that the first node has consumed a threshold amount of the first portion of the first zone; and responsive to determining the first node has consumed the threshold amount of the first portion of the first zone, dynamically determining a second boundary denoting a repartitioning of the first zone into a revised first portion and a revised second portion, wherein the revised first portion is assigned to the first node for allocating physical blocks of storage used exclusively by the first node, wherein the revised second portion is assigned to the second node for allocating physical blocks of storage used exclusively by the second node.

18. The non-transitory computer readable medium of claim 17, wherein a first plurality of parameters denotes the plurality of parameters used exclusively by the first node, and wherein a second plurality of parameters denotes the plurality of parameters used exclusively by the second node.

19. The non-transitory computer readable medium of claim 18, wherein the method further comprises:

updating the second parameter of the first plurality of parameters, used exclusively by the first node, to identify the second boundary; and updating the second parameter of the second plurality of parameters, used exclusively by the second node, to identify the second boundary.

20. The non-transitory computer readable medium of claim 17, wherein the method further comprises:

subsequent to said dynamically determining the second boundary, allocating a physical block of storage for the first node from the first revised portion.

* * * * *